(12) United States Patent
Ahn et al.

(10) Patent No.: US 9,930,094 B2
(45) Date of Patent: Mar. 27, 2018

(54) CONTENT COMPLEX PROVIDING SERVER FOR A GROUP OF TERMINALS

(71) Applicant: Industry-Academic Cooperation Foundation, Yonsei University, Seoul (KR)

(72) Inventors: Chie Teuk Ahn, Seoul (KR); Seung Yup Lee, Seoul (KR); Ju Wan Yoo, Seoul (KR)

(73) Assignee: Industry-Academic Cooperation of Yonsei University, Seoul (KR)

( * ) Notice: Subject to any disclaimer, the term of this patent is extended or adjusted under 35 U.S.C. 154(b) by 695 days.

(21) Appl. No.: 13/851,329

(22) Filed: Mar. 27, 2013

(65) Prior Publication Data

US 2013/0262569 A1 Oct. 3, 2013

(30) Foreign Application Priority Data

| Mar. 27, 2012 | (KR) | 10-2012-0031187 |
| Jul. 25, 2012 | (KR) | 10-2012-0081223 |
| Aug. 17, 2012 | (KR) | 10-2012-0090056 |

(51) Int. Cl.
*H04L 29/08* (2006.01)

(52) U.S. Cl.
CPC ............ *H04L 67/02* (2013.01); *H04L 67/306* (2013.01)

(58) Field of Classification Search
CPC ..... H04L 67/02; H04L 67/306; G06F 3/1454; G06F 3/1423
USPC .......................................................... 709/203
See application file for complete search history.

(56) References Cited

U.S. PATENT DOCUMENTS

| 9,098,868 | B1 * | 8/2015 | Issa | .................... G06Q 30/0272 |
| 2001/0018771 | A1 * | 8/2001 | Walker | ............... H04N 7/17318 725/91 |
| 2002/0056112 | A1 * | 5/2002 | Dureau | .................. H04H 20/08 725/78 |
| 2006/0236352 | A1 * | 10/2006 | Scott, III | ................. H04N 5/76 725/89 |
| 2007/0199035 | A1 * | 8/2007 | Schwartz | ............... H04N 7/163 725/110 |
| 2008/0082922 | A1 * | 4/2008 | Biniak | ............... H04N 7/17318 715/719 |

(Continued)

FOREIGN PATENT DOCUMENTS

| KR | 2004-0029298 A | 4/2004 |
| KR | 2006-0070185 A | 6/2006 |

(Continued)

OTHER PUBLICATIONS

Korean Office Action dated Oct. 30, 2013 for corresponding KR Patent Application No. 10-2012-0081223.

(Continued)

*Primary Examiner* — Andrew Georgandellis
(74) *Attorney, Agent, or Firm* — Brian J. Colandreo; Michael T. Abramson; Holland & Knight LLP

(57) ABSTRACT

The present invention provides a content complex providing server capable of providing a content complex containing a plurality of different constituent content used to deliver one subject by using a plurality of terminals such that the content complex can be played efficiently only by a minimum operation when a receiver of the content can watch or listen to the plurality of terminals simultaneously.

12 Claims, 32 Drawing Sheets

(56) References Cited

U.S. PATENT DOCUMENTS

| | | | |
|---|---|---|---|
| 2008/0092201 A1* | 4/2008 | Agarwal | H04N 7/17318 725/135 |
| 2009/0119719 A1* | 5/2009 | Matsuzaki | G06F 21/10 725/74 |
| 2010/0321275 A1* | 12/2010 | Hinckley | G06F 1/1618 345/1.3 |
| 2011/0040894 A1* | 2/2011 | Shrum, Jr. | H04L 65/4084 709/246 |
| 2011/0125809 A1* | 5/2011 | Woods | G06F 17/3002 707/809 |
| 2012/0177067 A1* | 7/2012 | Cho | H04N 21/4126 370/503 |
| 2012/0208455 A1* | 8/2012 | Hill | H04B 5/0031 455/41.1 |
| 2012/0210349 A1* | 8/2012 | Campana | G06F 3/147 725/32 |
| 2012/0233646 A1* | 9/2012 | Coniglio | H04N 21/234327 725/78 |
| 2012/0304224 A1* | 11/2012 | Hines | H04N 21/44008 725/34 |
| 2013/0170813 A1* | 7/2013 | Woods | H04N 5/765 386/200 |
| 2014/0156800 A1* | 6/2014 | Falvo | H04N 21/8456 709/219 |

FOREIGN PATENT DOCUMENTS

| | | |
|---|---|---|
| KR | 2007-0058295 A | 6/2007 |
| KR | 2009-0053619 A | 5/2009 |
| KR | 2009-0068712 A | 6/2009 |
| KR | 2010-0053135 A | 5/2010 |
| KR | 2010-0062006 A | 6/2010 |
| KR | 2010-0131685 A | 12/2010 |
| KR | 1020110052997 A | 5/2011 |
| KR | 1020110070393 A | 6/2011 |
| KR | 2011-0131764 A | 12/2011 |
| KR | 2012-0026290 A | 3/2012 |

OTHER PUBLICATIONS

Korean Notice of Allowance dated Nov. 19, 2013 for corresponding KR Patent Application No. 10-2012-0031187.
Korean Office Action dated Jan. 14, 2014 by the KIPO for KR Patent Application No. 10-2012-0090056 which was filed on Aug. 17, 2012. 6 pages.
English Abstract for KR 2011-0131764.
English Abstract for KR 2007-0058295.
Korean Office Action dated May 27, 2013 for Korean Patent Application No. 10-2012-0031187. 4 pages.

* cited by examiner

CONTENT COMPLEX PROVIDING SERVER FOR A GROUP OF TERMINALS

CROSS-REFERENCE TO RELATED APPLICATION

This application claims priority from Korean Patent Application Nos. 10-2012-0090056 filed on Aug. 17, 2012, 10-2012-0081223 filed on Jul. 25, 2012 and 10-2012-0031187 filed on Mar. 27, 2012 in the Korean Intellectual Property Office, and all the benefits accruing therefrom under 35 U.S.C. 119, the content of which in its entirety are herein incorporated by reference.

BACKGROUND

1. Technical Field

The present inventive concept relates to a content complex providing server for a plurality of terminals, and more particularly to a content complex providing server capable of providing a content complex containing a plurality of different constituent content such that the content complex can be played effectively by using a plurality of terminals.

2. Description of the Related Art

Since a smart mobile terminal such as a smart phone and a tablet PC has a computing power as good as a desktop computer, it is widely used to play content such as video. As one person can own a tablet PC as well as a smart phone, an environment of 1 person and N terminals gas been established. In this environment, a so-called N-screen technology has been used.

FIG. 1 is a diagram showing a concept of the N-screen technology according to the prior art. As shown in FIG. 1, a content providing server 13 for supporting an N-screen function stores information on a plurality of terminals 10, 11 and 12 owned by an N-screen service user, and transmits the content such that the terminal receiving the content to be played is changed sequentially as subscriber A moves. For example, if the service user is a student and moves in the order of home, school and bus, a video lecture can be played through a PC monitor or TV 10 at home. Also, while the service user is outside the home, it can be played continuously through a tablet PC 11 and a smart phone 12 owned by the user. Simply speaking, it creates an environment in which the content follows the subscriber.

However, in an N-screen service as illustrated in FIG. 1, one content can be played in connection between a plurality of terminals owned by a specific subscriber, and there is no effectiveness in a situation where the terminals can be operated at the same time. If there is one content complex constituted by a plurality of constituent contents, it will be useful for the user when using the content complex to allow a plurality of terminals to separately play the constituent contents of the content complex rather than allowing one terminal to play the content complex. Therefore, there is a need to provide technology for efficiently playing the content complex by using a plurality of terminals.

SUMMARY

The present invention provides a method and system capable of efficiently playing a content complex including a plurality of different constituent contents by using a plurality of terminals in a case where a recipient of the content can watch a plurality of terminals at the same time.

The present invention also provides a content complex providing server capable of providing a content complex containing a plurality of different constituent content used to deliver one subject by using a plurality of terminals such that the content complex can be played efficiently only by a minimum operation when a receiver of the content can watch or listen to the plurality of terminals simultaneously.

The present invention also provides a content complex providing server capable of providing a content complex containing a main content and an advertising content to a plurality of terminals such that playback of the advertising content does not interfere with playback of the main content when playing the content complex through a plurality of terminals.

The present invention also provides a content complex providing server wherein, if each of video conference participants has a terminal for capturing and displaying video in a video conference and an auxiliary terminal, the participants upload in advance supplementary materials to be used in the conference, the video of the other party is streamed in the terminal for capturing and displaying video, and the supplementary materials uploaded in advance by the other party are provided to the auxiliary terminal such that the supplementary materials can be played through the auxiliary terminal.

The present invention also provides a content complex providing server capable of providing a content complex containing a lecture video and a lecture supplementary content to be played through different terminals.

The objects of the present invention are not limited thereto, and the other objects of the present invention will be described in or be apparent from the following description of the embodiments.

According to an aspect of the present invention, there is provided a method of providing a content complex, comprising: receiving a request for playback of a content complex including a first constituent content and a second constituent content from a user who has registered a terminal group including a first terminal and a second terminal; designating at least one of the first terminal and the second terminal as a playback terminal of the first constituent content and designating one of the first terminal and the second terminal as a playback terminal of the second constituent content such that each of the first terminal and the second terminal plays at least one constituent content; and transmitting each of the constituent contents to the designated playback terminal.

According to another aspect of the present invention, there is provided a method of providing a content complex, comprising: receiving a request for playback of a content complex including a plurality of different constituent contents from a user who has registered a terminal group including a plurality of terminals; transmitting a list of constituent contents included in the content complex to one of terminals of the terminal group; receiving a playback terminal designating signal to designate one of terminals of the terminal group as a playback terminal for each of the constituent contents in response to transmission of the list of constituent contents; and transmitting each of the constituent contents to the designated playback terminal.

According to still another aspect of the present invention, there is provided a content complex providing system, comprising: a content complex storage unit which receives and stores a content complex including a plurality of different constituent contents; a terminal group storage unit which stores a plurality of terminals registered as terminals constituting a terminal group; a content-terminal matching unit which designates one of terminals of the terminal group as a playback terminal for each of the constituent contents included in the content complex; and a content transmission unit which transmits each of the constituent contents to the designated playback terminal.

According to still another aspect of the present invention, there is provided a computer-readable recording medium recording a content complex data set comprising: first constituent content data to N-th constituent content data (N is a natural number of 2 or more); playback schedule data including information about a playback start time and a playback end time of each constituent content assigned based on a timeline that is a flow of time according to playback of the entire content complex; and playback terminal requirements data for determining a playback terminal for each of the constituent contents data.

According to still another aspect of the present invention, there is provided a content complex providing system comprising: a video server which receives and stores a video type constituent content from a content complex including the video type constituent content and a non-video type constituent content, and transmits the video type constituent content to a first terminal in a video streaming manner; and an object server which receives and stores the non-video type constituent content from the content complex, converts the non-video type constituent content into a web-based content, and transmits the non-video type constituent content which has been converted into a web-based content to a second terminal by using a HTTP protocol, wherein the first terminal and the second terminal are terminals belonging to one terminal group.

According to still another aspect of the present invention, there is provided a content complex providing server, comprising: a content storage unit which stores package data of a content complex containing a first constituent content and a second constituent content; a profile storage unit which stores profile information of a first user, the profile information containing information on a terminal group including a first terminal and a second terminal; a terminal designating unit which, in response to the first user's request for playback of the content complex, designates at least one of the first terminal and the second terminal as a playback terminal of the first constituent content, designates one of the first terminal and the second terminal as a playback terminal of the second constituent content, and designates the playback terminal such that each of the first terminal and the second terminal plays at least one constituent content; and a content transmission unit which transmits each of the first constituent content and the second constituent content to the designated playback terminal.

According to still another aspect of the present invention, there is provided a content complex providing server, comprising: a content storage unit which stores package data of a content complex including content group A and content group B containing a first constituent content and a second constituent content, respectively; a profile storage unit which stores profile information of a first user, the profile information containing information on a terminal group including a first terminal and a second terminal; a terminal designating unit which, if there is an interaction input from one of the first terminal and the second terminal during playback of the content complex, determines one of the first constituent content group and the second constituent content group as a playback target content group according to the interaction input, designates at least one of the first terminal and the second terminal as a playback terminal of the first constituent content of the playback target content group, designates one of the first terminal and the second terminal as a playback terminal of the second constituent content of the playback target content group, and designates the playback terminal such that each of the first terminal and the second terminal plays at least one constituent content; and a content transmission unit which transmits each of the first constituent content and the second constituent content of the playback target content group to the designated playback terminal.

According to still another aspect of the present invention, there is provided an a content complex providing server, comprising a content storage unit which stores package data of a content complex containing a main content and a first advertising content, a profile storage unit which stores profile information of a first user, the profile information containing information on a terminal group including a plurality of terminals, a terminal designating unit which, in response to the first user's request for playback of the content complex, designates one or more terminals among the terminals of the terminal group as playback terminals of the main content, designates one or more terminals among the remaining terminals, which are not designated as the playback terminals of the main content, as playback terminals of the first advertising content, and provides playback terminal information of each content included in the content complex to a content transmission unit; and the content transmission unit which receives the playback terminal information from the terminal designating unit, and transmits the main content to the playback terminals of the main content and the first advertising content to the playback terminals of the advertising content.

According to still another aspect of the present invention, there is provided a content complex providing server, comprising a content storage unit which stores package data of a content complex containing first and second advertising content each having an advertising target user requirement, and a main content, a profile storage unit which stores profile information of a first user, the profile information containing information on a terminal group including a plurality of terminals and personal information of the first user, an advertisement selecting unit which, in response to the first user's request for playback of the content complex, selects one or more content of the first and second advertising content as advertisement executing content according to whether the profile information of the first user meets the advertising target user requirement of the first and second advertising contents, and provides information on the advertisement executing content to a terminal designating unit, the terminal designating unit which receives information on the advertisement executing content, designates one or more terminals among the terminals of the terminal group as playback terminals of the main content, designates one or more terminals among the remaining terminals, which are not designated as the playback terminals of the main content, as playback terminals of each of the advertisement executing content, and provides playback terminal information of the main content and the advertisement executing content to a content transmission unit; and the content transmission unit which receives the playback terminal information of the main content and the advertisement executing content, and transmits the main content and the advertisement executing content to the playback terminals.

According to still another aspect of the present invention, there is provided a content complex providing server, comprising a content storage unit which stores package data of a content complex containing a main content and first and second advertising content each having an advertisement target user requirement, a profile storage unit which stores information on a terminal group including a shared terminal to be used commonly, a first terminal only for a first user and a second terminal only for a second user, and profile information of the first user and the second user, a terminal designating unit which, in response to a request for playback of the content complex, designates one or more terminals of the first terminal and the second terminal as playback terminals of each of the first and second advertising content according to whether the profile information of the first user and the second user stored in the profile storage unit meets advertisement target user requirement of the first and second advertising content, and provides information on the playback terminals of the main content and the first and second advertising content to a content transmission unit and the content transmission unit which receives information on the playback terminals of the main content and the first and second advertising content, transmits the main content to the shared terminal, and transmits the first and second advertising content to the playback terminals.

According to still another aspect of the present invention, there is provided a content complex providing server, comprising a content storage unit which stores package data of a first content complex containing a first constituent content and package data of a second content complex containing a second constituent content, a profile storage unit which stores profile information of the first user and the second user, each profile information containing information on a terminal group including a first terminal and a second terminal and a content transmission unit which, in response to a request for a start of a conference, transmits first video streaming data captured by the first terminal of the first user to the first terminal of the second user, transmits second video streaming data captured by the first terminal of the second user to the first terminal of the first user, and transmits the constituent content included in the first content complex to at least one terminal of the terminal group of the second user, and the constituent content included in the second content complex to at least one terminal of the terminal group of the first user, wherein the package data of the first content complex is uploaded in the content storage unit by the first user, and the package data of the second content complex is uploaded in the content storage unit by the second user.

According to still another aspect of the present invention, there is provided a content complex providing server, comprising a content storage unit which stores package data of a content complex containing a first lecture video content and a first lecture supplementary content, a the profile storage unit which stores profile information of a student, the profile information containing information on a terminal group including a plurality of terminals, a terminal designating unit which, in response to the student's request for playback of the content complex, designates one or more terminals among the terminals of the terminal group as playback terminals of the first lecture video content, designates one or more terminals of the remaining terminals which are not designated as the playback terminals of the lecture video content as playback terminals of the first lecture supplementary content, and provides information on the playback terminals of the content included in the content complex to a content transmission unit and the content transmission unit which receives information on the playback terminals and transmits the first lecture video content and the first lecture supplementary content to the playback terminals.

According to still another aspect of the present invention, there is provided a content complex providing server, comprising a content storage unit which stores package data of a content complex containing a lecture video content and first and second lecture supplementary contents each having target user requirements, a profile storage unit which stores information on a terminal group including a shared terminal to be used commonly, a first terminal only for a first user and a second terminal only for a second user, and profile information of the first user and the second user, a terminal designating unit which, in response to a request for playback of the content complex, designates one or more terminals of the first terminal and the second terminal as playback terminals of each of the first and second lecture supplementary content according to whether the profile information of the first user and the second user stored in the profile storage unit meets the target user requirements of the first and second lecture supplementary content, and provides information on the playback terminals of the content included in the content complex to a content transmission unit and the content transmission unit which receives information on the playback terminals, transmits the lecture video content to the shared terminal, and transmits the first and second lecture supplementary contents to the playback terminals.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
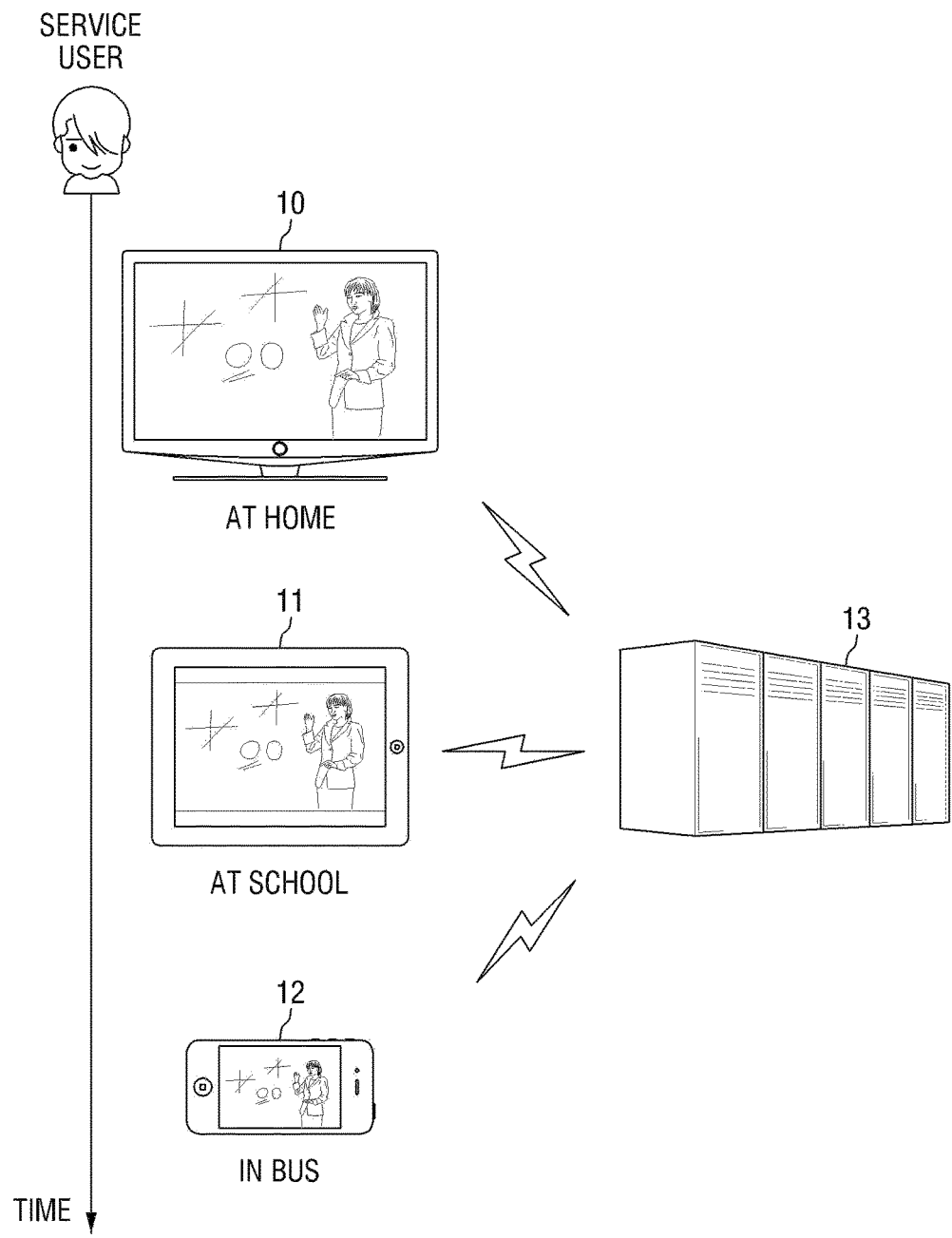
FIG. 1 is a diagram showing a concept of an N-screen technology according to the prior art.
Figure 2:
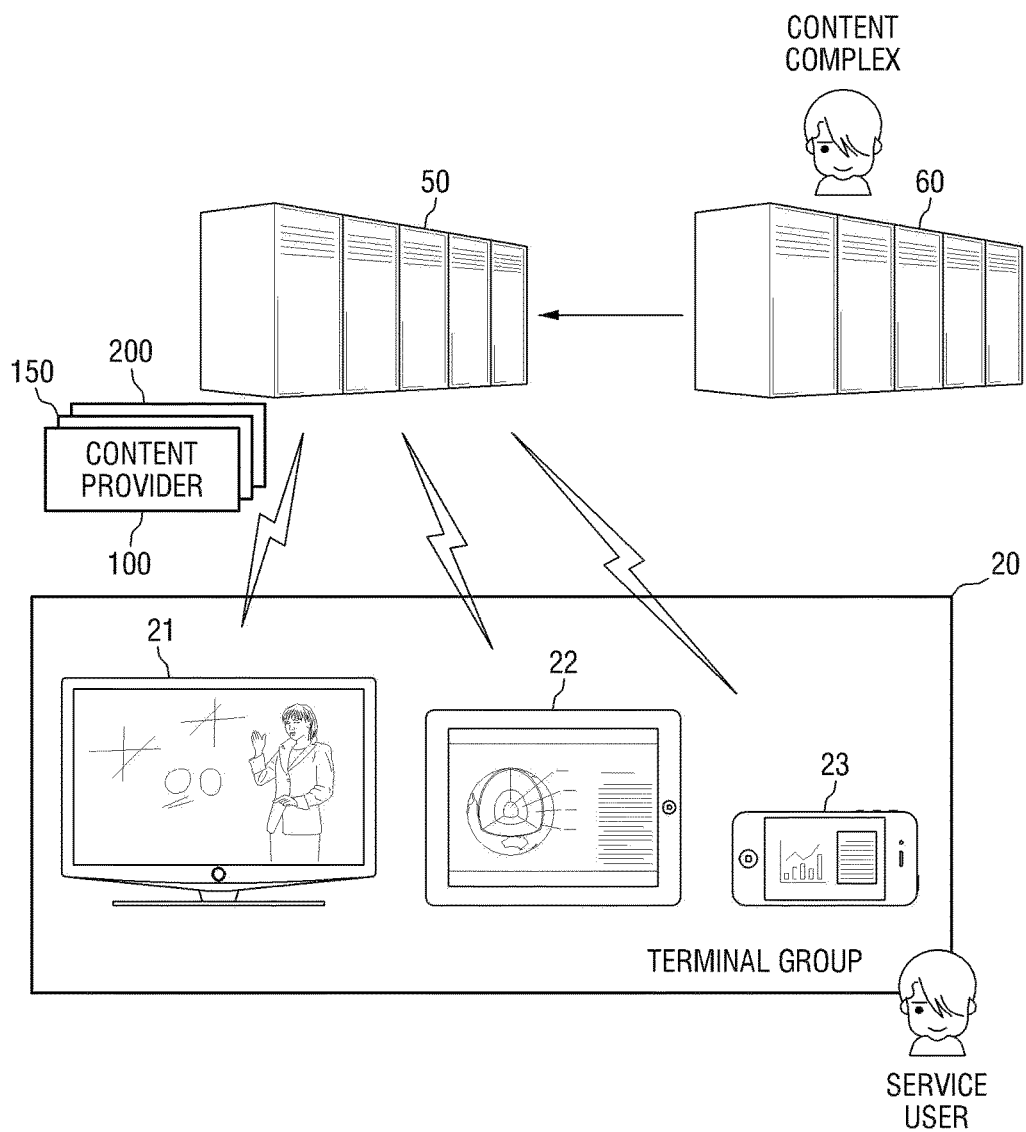
FIG. 2 is a diagram schematically showing an operation of a content complex providing server in accordance with an embodiment of the present invention.

An operation of a content complex providing server 50 in accordance with an embodiment of the present invention will be described in brief with reference to FIG. 2.

In the N-screen technology according to the prior art, one content is played in multiple terminals in connection with each other. On the other hand, in the content complex providing technology according to the present invention, a plurality of constituent contents included in the content complex are distributed to a plurality of terminals 21, 22 and 23 owned by a service subscriber and played. The terminals 21, 22 and 23 constitute one terminal group 20. A plurality of terminals included in one terminal group 20 may be the same type of terminals and different types of terminals.

Two or more content among the plurality of constituent contents may be played simultaneously at least at some time points within the entire playback duration of the content complex. At least some constituent contents among the plurality of constituent contents may have playback start and end times different from those of the other constituent contents.

Each of the plurality of constituent contents included in the content complex is one completed content in itself, but the constituent contents constitute one content complex by playing a plurality of constituent contents in the respective playback terminals according to the determined schedule or scenario.

The constituent contents may be of different content types or the same content type. For example, the content complex may include one main video and supplementary presentation materials, or include one main video and one supplementary video.

The content type refers to a type of content, and for example, the content type may be one of a video, image, flash video, presentation material, document, 3D object, and sound file.

In the following description, "playback" of the content may mean displaying non-video type content as well as playing a video, flash video and sound file. The non-video type content may mean all content other than the video.

The content complex providing server 50 according to the embodiment of the present invention, in response to a user's request for playback of the content complex, designates on its own which terminal among the terminals included in the terminal group 20 is used to play each of the constituent contents included in the content complex, or receives an input from the user. When the content complex providing server 50 not only designates on its own which terminal plays the content, but also receives an input from the user, the following requirements should be satisfied. Hereinafter, a case where the content complex includes first and second constituent contents and a case where the terminal group 20 includes first and second terminals will be assumed for convenience of explanation. However, the present invention can be applied extensively to a case where the content complex includes three or more constituent contents and a case where the terminal group 20 includes three or more terminals.

First, one or more terminals of the first terminal and the second terminal are designated as playback terminals of the first constituent content, and one of the first terminal and the second terminal is designated as a playback terminal of the second constituent content. Then, playback terminals are designated such that each of the first terminal and the second terminal plays at least one constituent content. That is, the content complex providing server 50 designates the playback terminals such that the constituent contents included in the content complex are played through one or more terminals, and at least two terminals play at least one constituent content. Further, the content complex providing server 50 designates the playback terminals such that all terminals included in the terminal group 20 do not play the same constituent content.

The content complex providing server 50 may receive data for constituting the content complex provided from a storage device 60 of a content provider, and generate and store package data of the content complex by using the provided data.

Figure 3A:
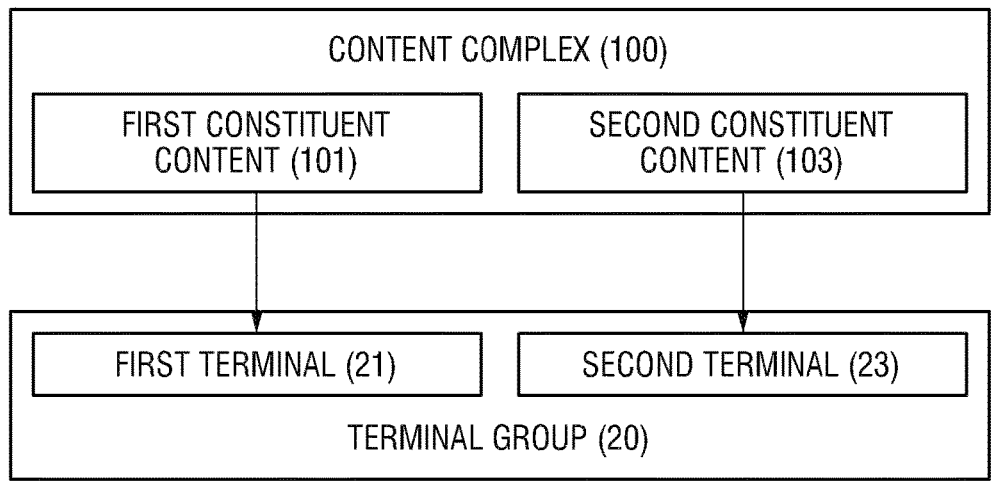
FIGS. 3A and 3B are schematic diagrams showing examples in which playback terminals are designated according to an operation of a content complex providing server in accordance with an embodiment of the present invention.
Figure 3A:
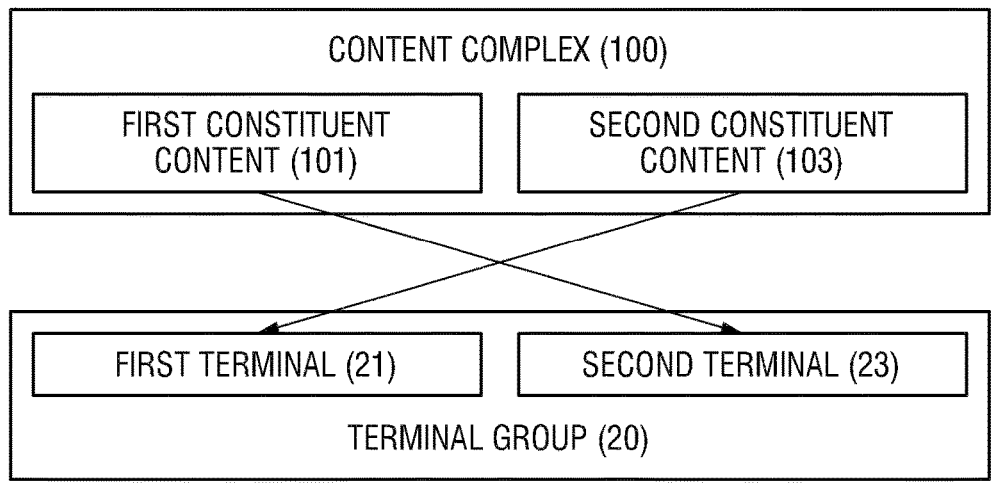
Figure 3B:
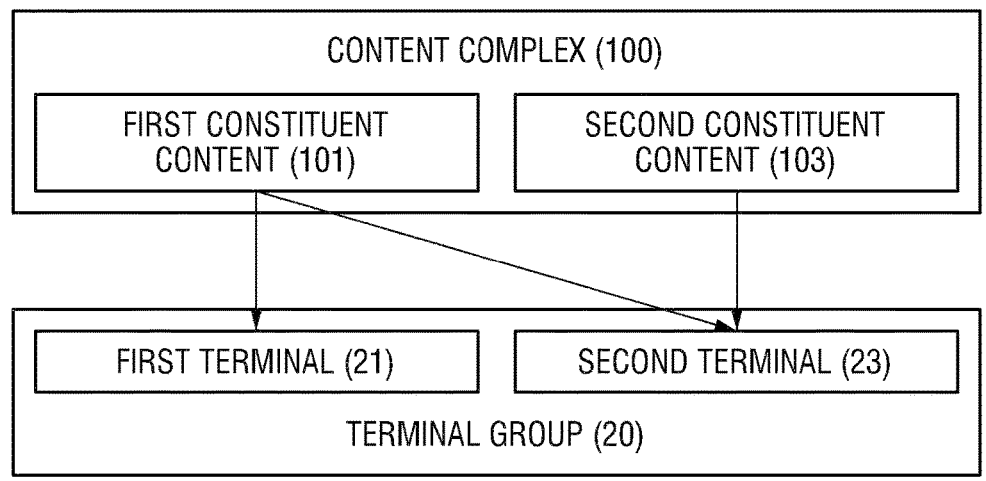
Figure 3B:
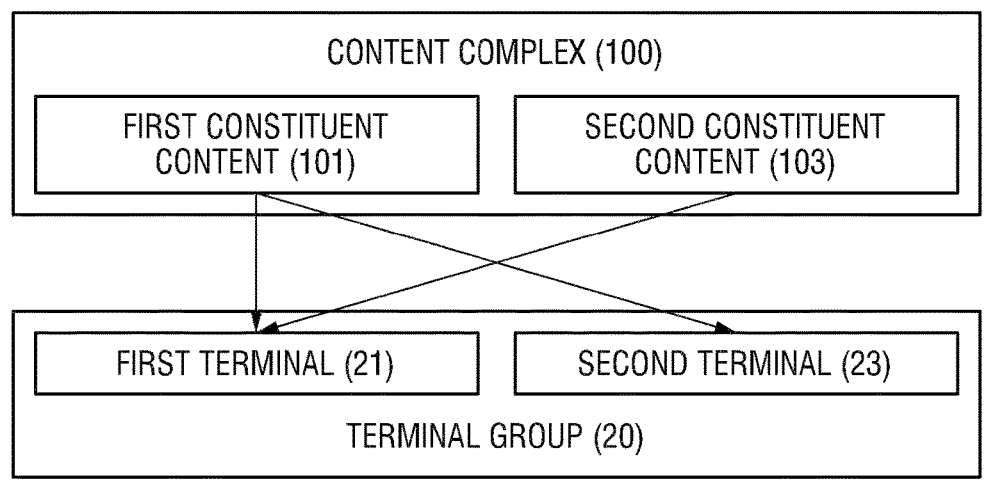

The contents complex providing server 50 may designate the playback terminals of the constituent contents such that the constituent contents and the terminals have a one-to-one relationship as shown in FIG. 3A. Further, the playback terminals of the constituent contents may be designated such that some of the constituent contents have two or more playback terminals as shown in FIG. 3B.

Figure 3C:
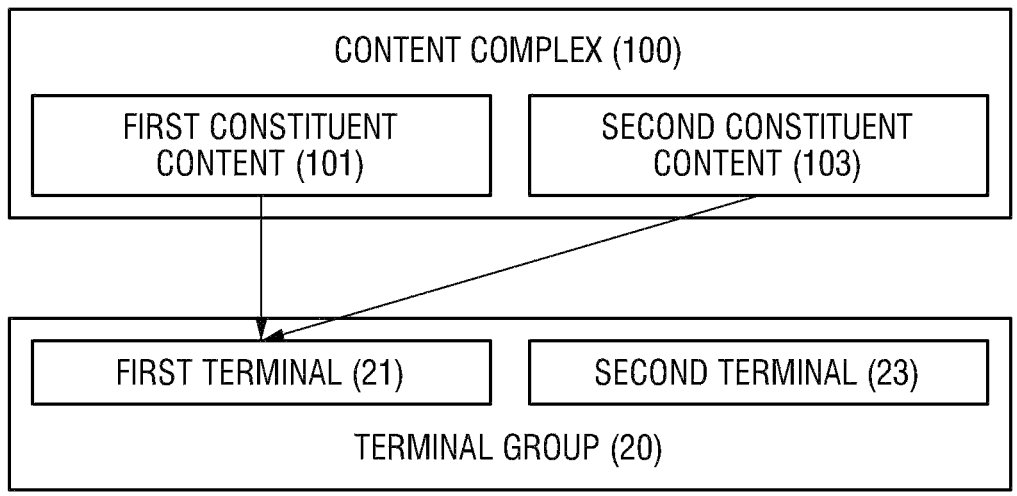
FIGS. 3C and 3D are schematic diagrams showing examples other than the examples in which playback terminals are designated according to the operation of the content complex providing server in accordance with the embodiment of the present invention.
Figure 3D:
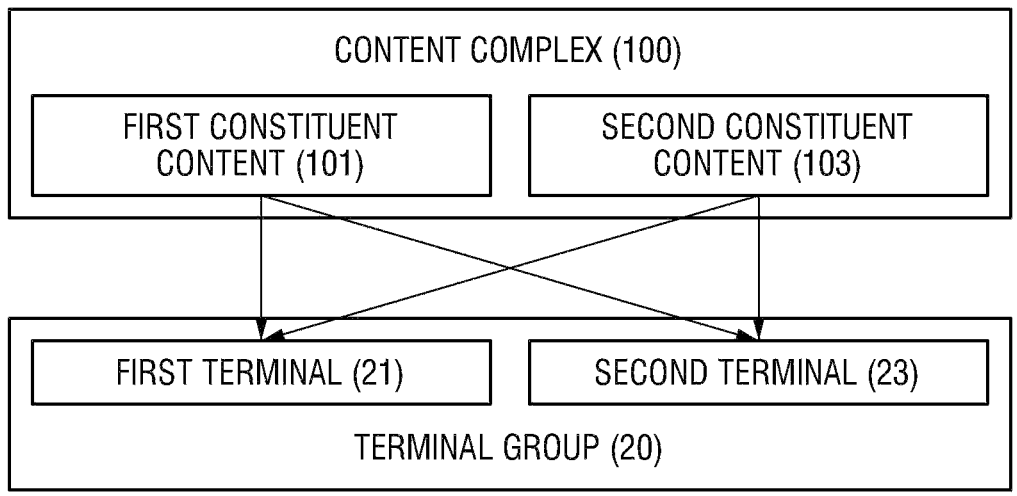

However, the content complex providing server 50 does not designate the playback terminals such that there is no playback terminal which does not play the constituent content as shown in FIG. 3C, or each of the terminals plays the same constituent contents as shown in FIG. 3D.

Hereinafter, a configuration example of the content complex according to the present invention will be described with reference to FIGS. 4 to 7.

Figure 4:
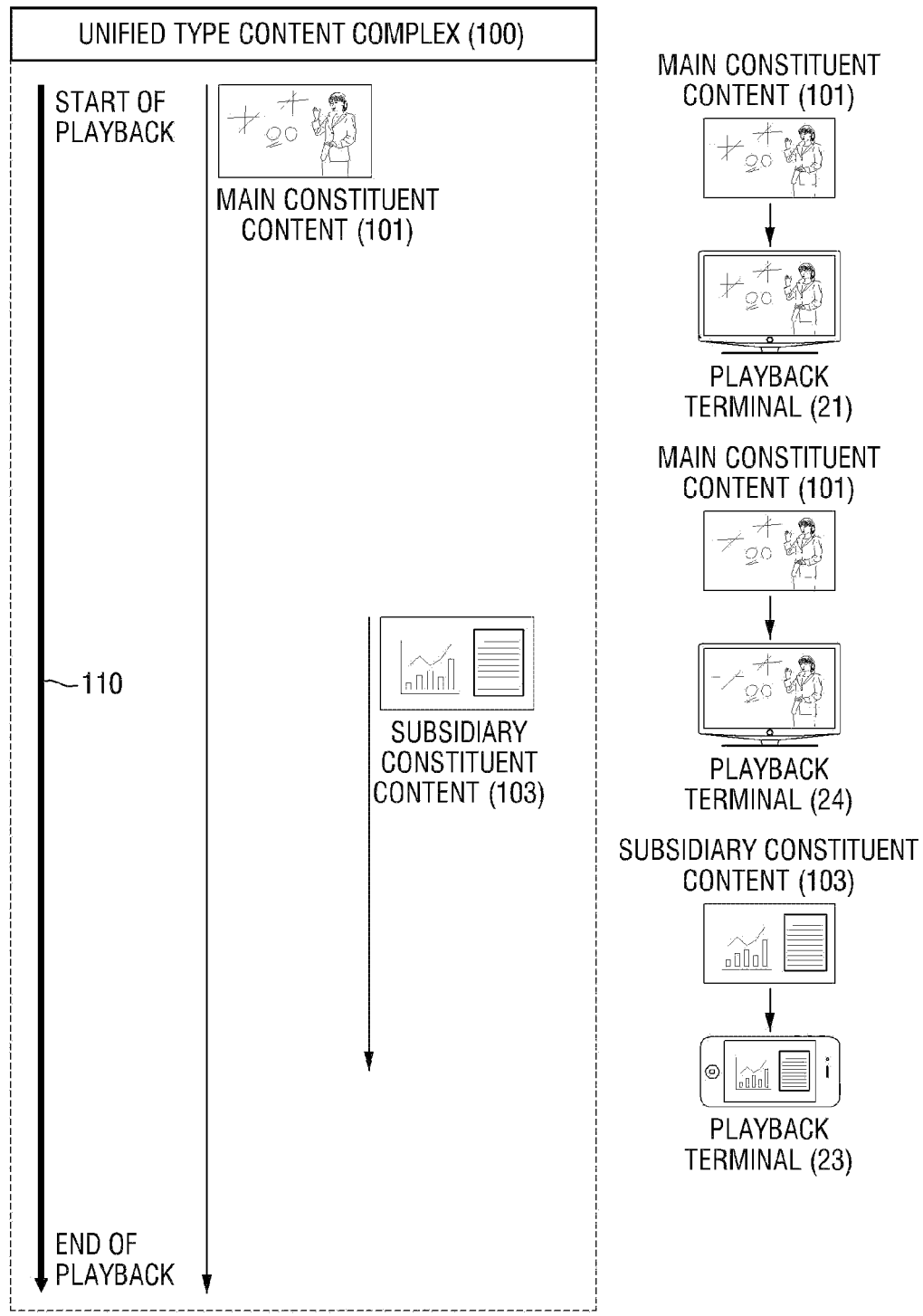
FIGS. 4 to 6 are conceptual diagrams showing a configuration of the content complex in accordance with the embodiment of the present invention.

First, FIG. 4 shows a unified type content complex 100 in which all constituent contents 101, 102 and 103 disposed on a timeline 110 are played uniformly by all recipients. The timeline 110 means a flow of the time according to the playback of the entire content complex 100.

The unified type content complex 100 shown in FIG. 4 includes a lecture video 101 to be played in the entire sections of the timeline 110, a 3D object 102 to be played in some sections in the middle of the timeline 110, and presentation materials 103 to be played in some sections in the middle of the timeline 110 after the playback of the 3D object 102 is completed.

A user who plays the unified type content complex 100 may receive the following user experience UX. In the following, it is assumed that the user has registered three terminals in total, i.e., a PC 21, a tablet PC 22 and a smart phone 23, as a terminal group in the content complex providing server 50.

If the user makes a request for playback of the unified type content complex 100, the lecture video 101 is played through a monitor of the PC 21. The lecture video 101 is played until the end of playback of the unified type content complex 100 from the start of the playback. At the time when there is a need for understanding of a three-dimensional structure while the lecture video 101 is played through the monitor of the PC 21, the 3D object 102 in which the three-dimensional structure has been expressed is automatically played through the tablet PC 22 of the user. At the time when there is a need to organize the contents while the lecture video 101 is played through the monitor of the PC 21, the presentation materials 103 for organizing the contents are played through the smart phone 23 of the user.

Instead of allowing the user to play all of the lecture video 101, the 3D object 102 and the presentation materials 103 through one terminal, e.g., the PC 21, the lecture video 101, the 3D object 102 and the presentation materials 103 are distributed to various terminals owned by the user and played through the terminals. Accordingly, there is an effect of increasing the understanding of the lecture and distributing the computational load in charge of each of the terminals 21, 22 and 23, thereby ensuring the playback quality.

Figure 5:
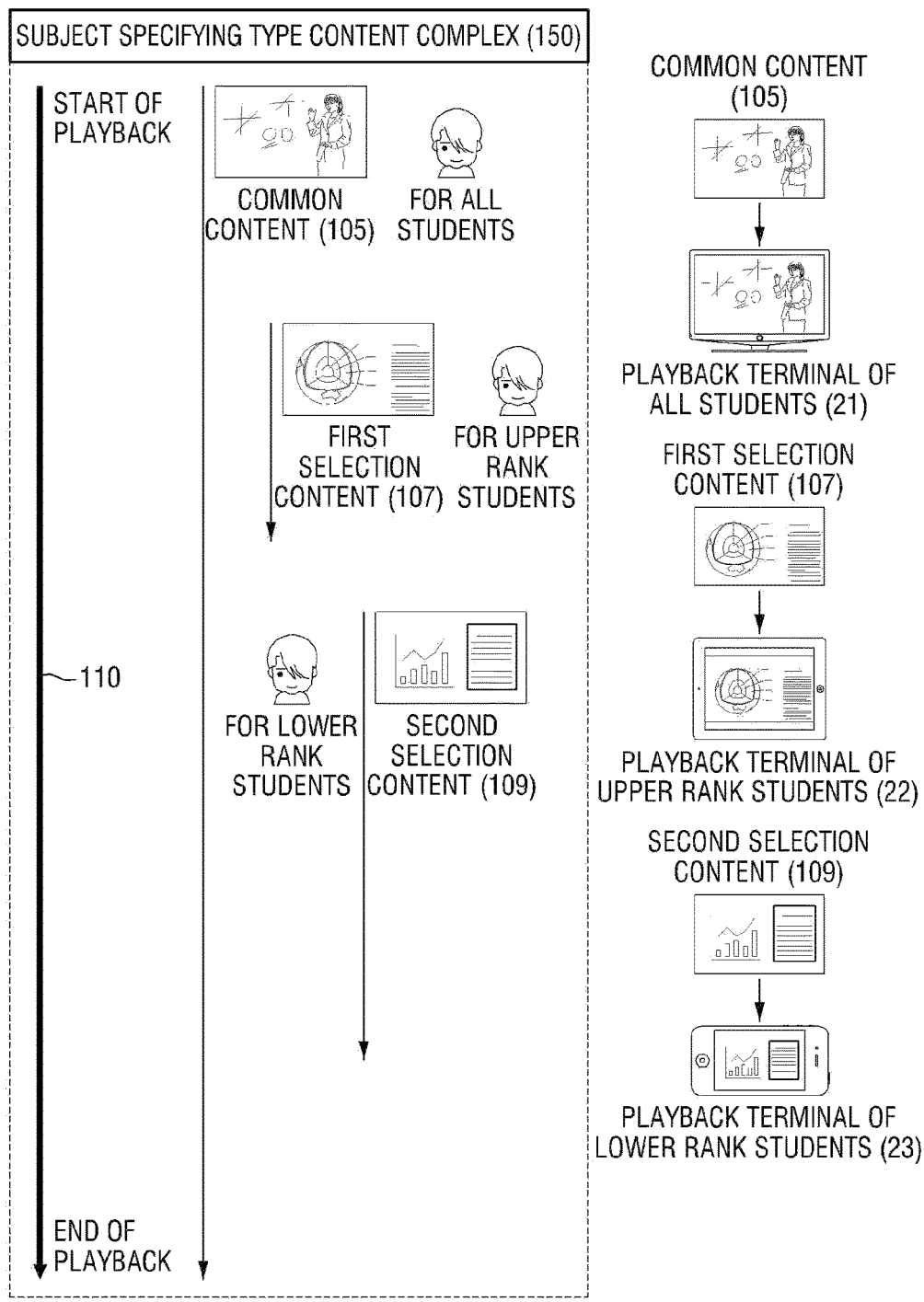

FIG. 5 illustrates a subject specifying type content complex 150 configured to change the constituent contents to be played in response to the attributes of each recipient. The constituent contents included in the subject specifying type content complex 150 may be divided into a common content 105 and a plurality of selection contents 107 and 109. The common content 105 is a constituent content to be played in the same way by all users, and the selection contents 107 and 109 are constituent contents to be played selectively according to the attributes of the user.

The subject specifying type content complex 150 illustrated in FIG. 5 is played in the entire sections of the timeline 110. The subject specifying type content complex 150 includes the common content 105 to be played for all students, the first selection content 107 to be played only in some sections in the middle of the timeline 110 and targeted for some students, e.g., upper rank students, and the second selection content 109 to be played only in some sections in the middle of the timeline 110 after completing the playback of the first selection content 107 and targeted for some students, e.g., lower rank students.

The personal information such as a student's grade referred to determine the selection contents 107 and 109 to be played may be included in, e.g., the service subscriber information. That is, the selection contents 107 and 109 to be played are determined based on the attributes of each recipient, and the attribute values can be obtained from the subscriber information for each recipient. However, according to some embodiments, the attribute values that are not included in the subscriber information of each recipient may be referred to determine the selection contents 107 and 109 to be played. For example, the selection contents 107 and 109 to be played may be determined based on the value inputted from the recipient during the playback of the content complex.

A user who plays the subject specifying type content complex 150 may receive the following user experience UX.

If the user makes a request for playback of the subject specifying type content complex 150, the common content 105 is played through a playback terminal 21 being watched by all students. The common content 105 may be, e.g., a lecture video. The common content 105 is played until the end of playback of the subject specifying type content complex 150 from the start of the playback. At the time when there is a need for an intensive understanding of a three-dimensional structure while the common content 105 is played through the playback terminal 21, the first selection content 107 in which the three-dimensional structure has been expressed is automatically played through a playback terminal 22 owned by an upper rank student. If it is determined that the intensive understanding of a three-dimensional structure may cause a confusion with other concepts to intermediate and lower rank students from the educational perspective, the first selection content 107 in which the three-dimensional structure has been expressed can be played only in the playback terminal 22 of the upper rank student.

At the time when there is a need to organize the content while the common content 105 is played, the second selection content 109 corresponding to presentation materials related to organizing the content is played through a playback terminal 23 owned by a lower rank student. If it is determined that organizing the content is unnecessary to an upper rank student from the educational perspective, the second selection content 109 can be played only in the playback terminal 23 of the lower rank student.

Figure 6:
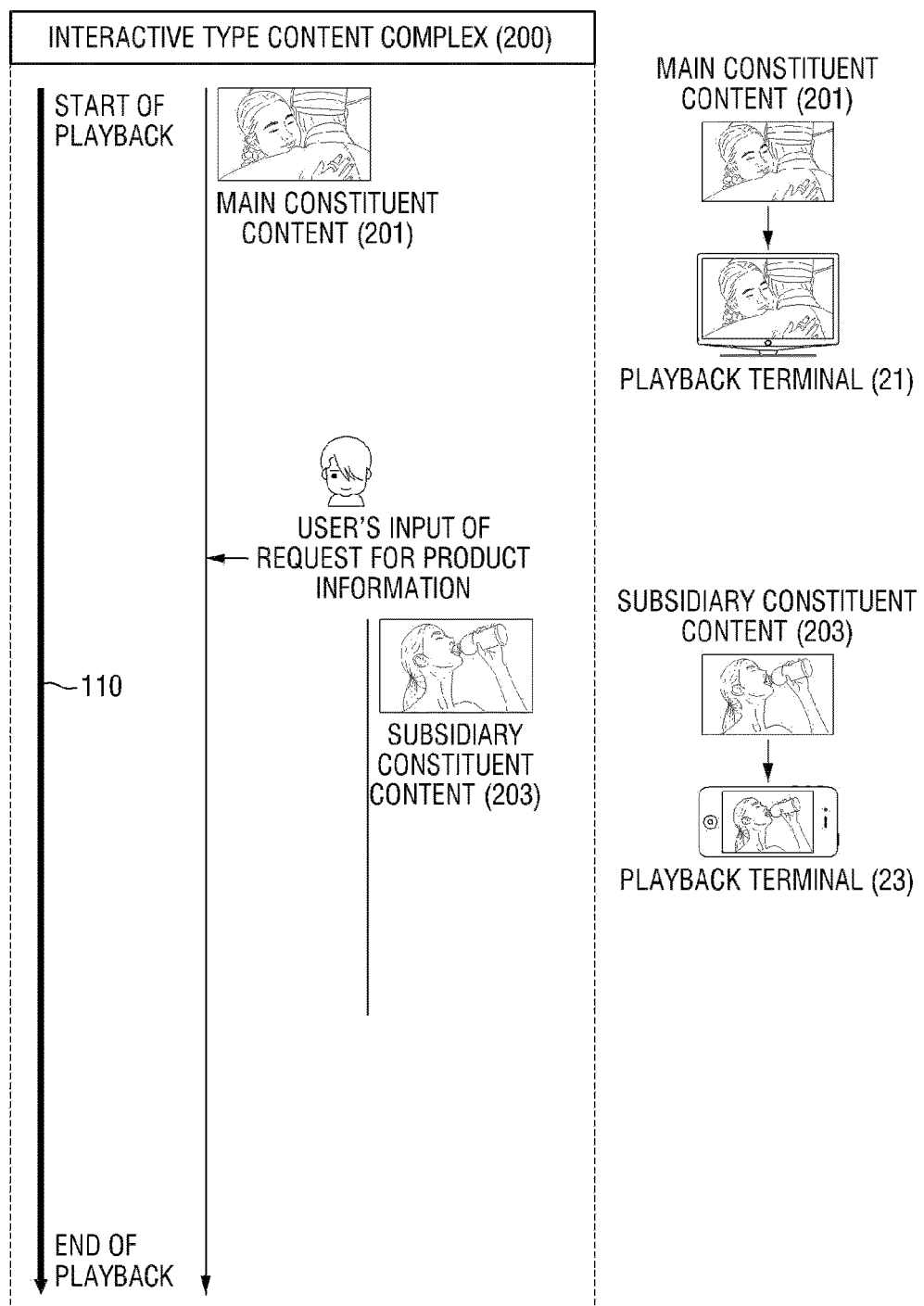

FIG. 6 shows an interactive type content complex 200 in which the playback of the other constituent content is started by using the other terminal while using an input to one terminal as a trigger.

The interactive type content complex 200 shown in FIG. 6 includes a main constituent content 201 to be played during the entire sections of the timeline 110, and a subsidiary constituent content 203 to be played if there is a specific input in a particular section of the timeline 110. For example, the main constituent content 201 may be a TV drama, and the subsidiary constituent content 203 may be an advertising content.

A user who plays the interactive type content complex 200 may receive the following user experience UX.

If the user makes a request for playback of the interactive type content complex 200, the main constituent content 201 is played through the playback terminal 21. The main constituent content 201 is played until the end of playback of the interactive type content complex 200 from the start of the playback. If a particular product to which PPL (Product Placement) has been applied appears while the main constituent content 201 is played through the playback terminal 21, the user may make an input meaning a request for advertising information through the playback terminal 21 via a TV remote control or the like. In that case, the subsidiary constituent content 203 for the particular product is automatically played through the playback terminal 23.

The interactive type content complex 200 provides an effect of variously setting which constituent contents will be played in which terminal according to the reaction of the user.

According to one embodiment, the interactive type content complex 200 configured for each chapter may also be provided by the content complex providing server 50. A configuration of the interactive type content complex 200 according to the present embodiment will be described in more detail with reference to FIG. 7.

The interactive type content complex 200 configured for each chapter includes a plurality of content groups, each including at least one constituent content. Each of the content groups is a group of constituent contents to be played in a certain situation in a particular chapter. In order to proceed to the next chapter, an interaction input may be entered from the user.

Figure 7:
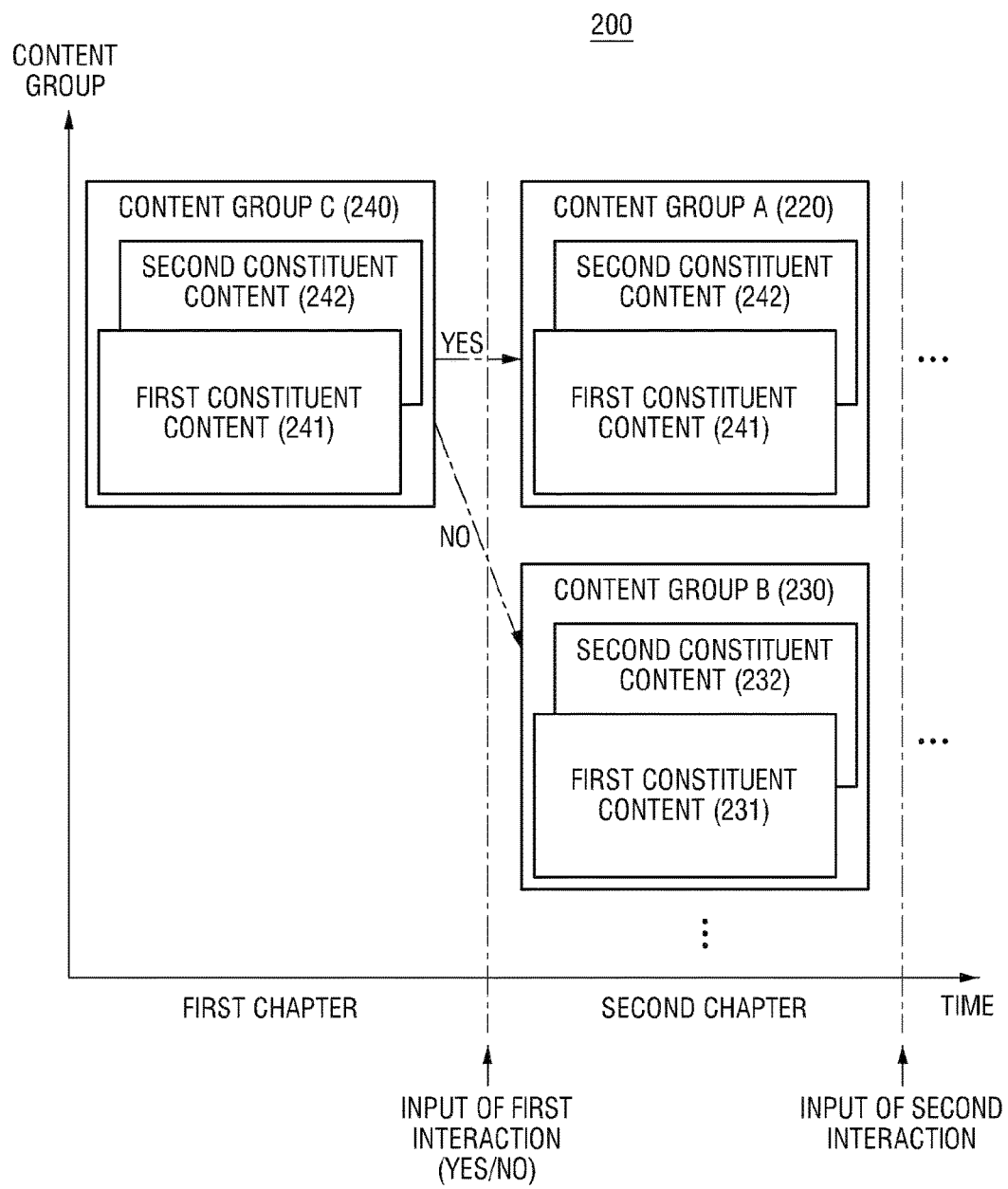
FIG. 7 is a diagram showing a configuration of an interactive type content complex in accordance with the embodiment of the present invention.

As shown in FIG. 7, if a first chapter is playing currently, the constituent contents included in a content group C 240. A first constituent content 241 included in the content group C 240 may be played through a first terminal, and a second constituent content 242 included in the content group C 240 may be played through a second terminal.

The content group to be played in a second chapter may be determined according to a first interaction inputted after the playback of the first chapter has ended. For example, there is displayed a question to induce the first interaction through the first or second constituent content 241 or 242 of the content group C 240 at the time of ending the playback of the first chapter, and the user may answer to the question by Yes or No. As shown in FIG. 7, it may be configured such that when it is answered by Yes, a content group A 220 in the second chapter is played, and when it is answered by No, a content group B 230 is played. Although only two content groups have been illustrated as the content groups that can be played in the second chapter in FIG. 7, three or more content groups may also be played, and a format of data which can receive an input of the interaction is not fixed to Yes/No.

Next, a configuration and operation of the content complex providing server in accordance with one embodiment of the present invention will be described with reference to FIGS. 8 to 10.

The content complex providing server 50 in accordance with one embodiment of the present invention includes a content complex storage unit 51, a terminal group storage unit 55, a content-terminal matching unit 54, and a content transmission unit 57.

The content complex storage unit 51 receives and stores a content complex including a plurality of different constituent contents. More specifically, one or more content complex data sets 510 having one-to-one correspondence to the content complex may be stored in the content complex storage unit 51. A data structure of the content complex data set 510 will be described in detail later.

The terminal group storage unit 55 registers a plurality of terminals as the constituent terminals of the terminal group, and stores them. Information about a plurality of terminals constituting the terminal group may have been inputted through terminal group registration UI (not shown) provided through a user access processing unit 56.

The content-terminal matching unit 54 designates one of the terminals of the terminal group as a playback terminal for each of the constituent contents included in the content complex.

Meanwhile, there may be a situation where it is unnecessary to play all constituent contents included in the content complex. For example, if the content complex is a lecture content, the content complex may include all of lecture supplementary contents only for upper rank students and lecture supplementary contents only for lower rank students. However, if the upper rank student makes a request for playback of the lecture content, there would be no need to play the lecture supplementary contents only for the lower rank students. In this case, if a service content selection unit 52 selects some of the constituent contents included in the content complex as service target contents, the content-terminal matching unit 54 may designate one of the terminals of the terminal group as a playback terminal for each of the service target contents.

The service content selection unit 52 may select the service target contents based on at least one of the attribute values of member information that is stored in a user attribute storage unit 53. For example, it is possible to select different service target contents between men and women.

The user attribute storage unit 53 stores the user attributes inputted through the user access processing unit 56. For example, the user attribute storage unit 53 may store profile information such as the user's personal information and the like.

The user access processing unit 56 may receive a user's request for playback of the content complex, or receive information for specifying the terminal group, and provide the information to the user attribute storage unit 53 and the terminal group storage unit 55.

Figure 8:
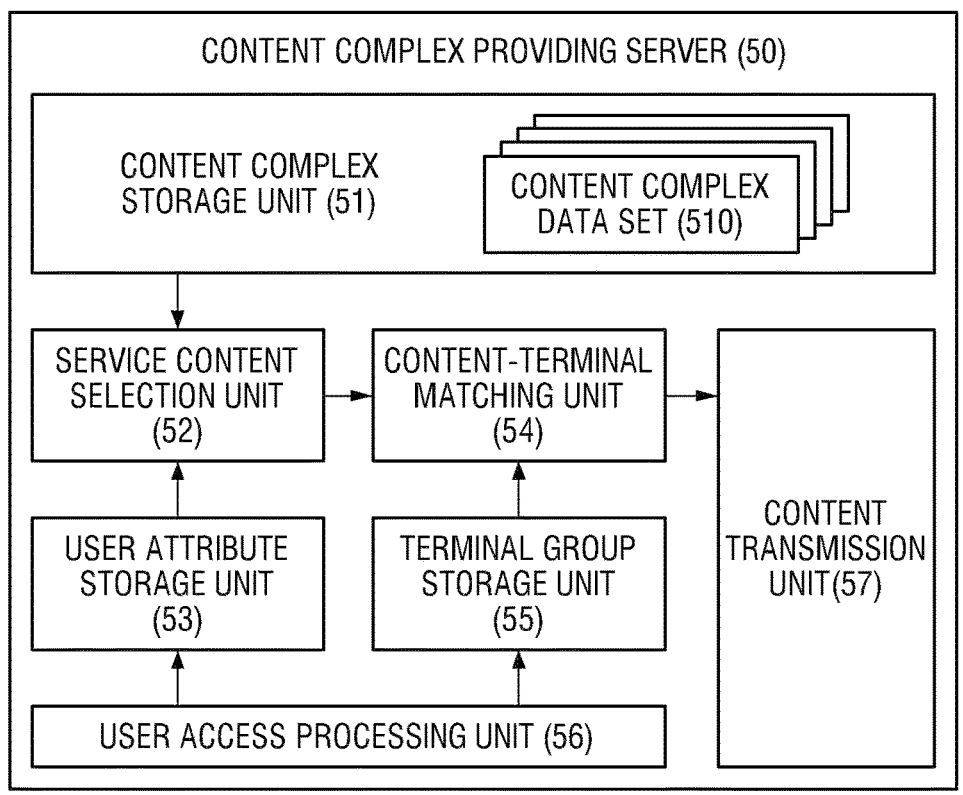
FIG. 8 is a block diagram of a content complex providing server in accordance with the embodiment of the present invention.
Figure 9:
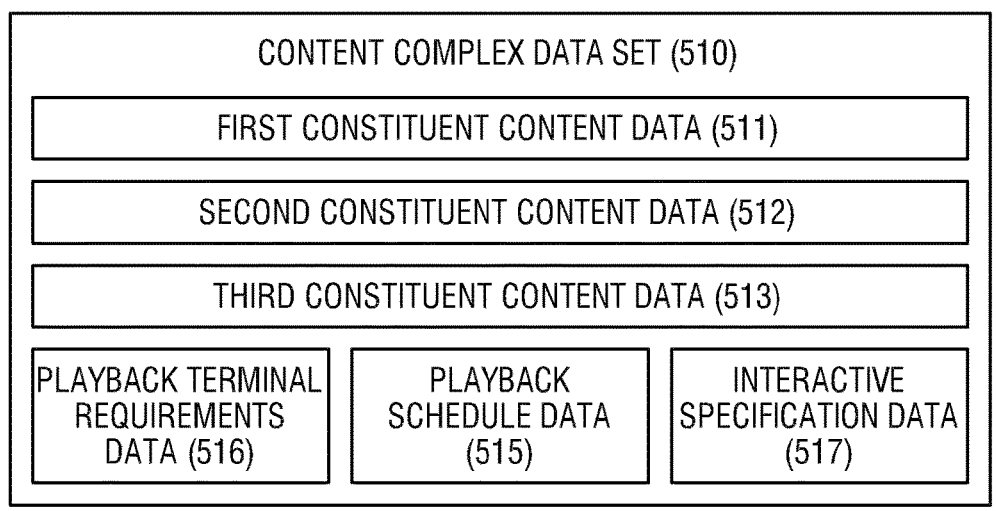
FIG. 9 is a diagram showing a data structure of a content complex data set in accordance with the embodiment of the present invention.

Each component of FIG. 8 may mean a software or hardware component such as a field-programmable gate array (FPGA) or an application-specific integrated circuit (ASIC). However, these components are not limited to the software or hardware components, and may be configured so as to be present in an addressable storage medium or to execute one or more processors. Functions provided within the components can be implemented by subdivided components or one component that combines a plurality of components to perform a specific function.

A computer-readable recording medium storing a content complex data set in accordance with the embodiment of the present invention will be described with reference to FIG. 9. The content complex data set 510 shown in FIG. 8 may be stored in the content complex storage unit 51 of FIG. 7. The content complex data set 510 including three constituent content data 511, 512 and 513 has been illustrated in FIG. 8, but it is intended for convenience of explanation, and the content complex data set 510 according to this embodiment may be configured such that the number of constituent content data is two or more.

The constituent content data 511, 512 and 513 is digital data that is decoded if it is inputted into a playback program such that each of constituent contents can be played. For example, it may be a video file, 3D object file, presentation file or the like.

According to some embodiments, a non-video type constituent content may be converted and stored in the form of web-based content. In this case, the constituent content data 511, 512 and 513 may include a web document file created such that the non-video constituent content is played if it is accessed by a web browser program installed in the playback terminal, and an object file embedded in the web document.

The content complex data set 510 may further include a playback schedule data 515 and a playback terminal requirements data 516.

The playback schedule data 515 includes information about playback start time and playback end time of each constituent content assigned based on the timeline that is a flow of time according to playback of the entire content complex. For example, if the playback of the second constituent content is started when 20 minutes and 30 seconds have passed after the start of playback of the entire content complex and the playback should be performed for 30 seconds, the playback schedule data 515 may include data that can be interpreted such that a period of 20 minutes and 30 seconds and a period of 21 minutes are set as the playback start time and the playback end time of the second constituent content.

The playback terminal requirements data 516 includes information that is used to determine the playback terminal for each constituent content data.

For example, the playback terminal requirements data 516 may include a list of model identification information of the terminal in which each constituent content can be played. A priority may be assigned to the list of model identification information of the terminal.

Further, the playback terminal requirements data 516 may include model characteristics information of the terminal in which each constituent content can be played. A value corresponding to the model characteristics may be a value determined by a combination of at least one of a display size, resolution, computing power and input means. For example, the model characteristics information may be set such that the first constituent content that is a video content among the constituent contents of the content complex is played only in a model in which the display size is 7 inches or more and the resolution is 1024×768 or more.

Meanwhile, if there is an interactive content which provides a user interface (UI) for user input among the constituent contents, an interactive specification data 517 for defining an operation corresponding to a user input inputted through the user interface (UI) may be further included in the content complex data set 510. That is, the interactive specification data 517 may be included in the content complex data set 510 as long as there are one or more interactive contents among the constituent contents. The interactive specification data 517 is data corresponding to a specific input for the user interface (UI) and a specific operation performed on one or more target content data specified in the constituent content data other than the first constituent content data.

Figure 10:
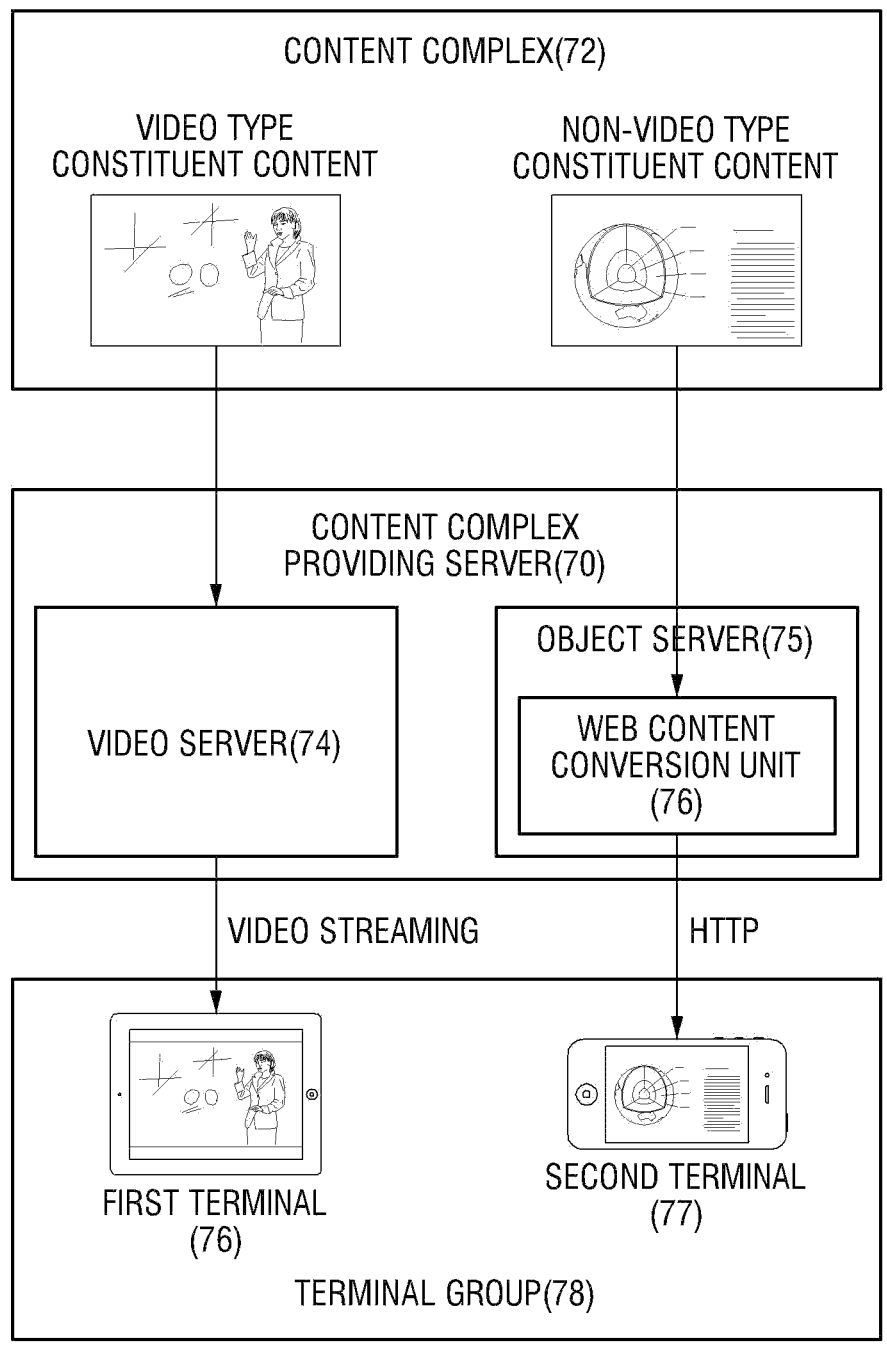
FIG. 10 is a diagram showing a configuration of a content complex providing system including a video server and an object server in accordance with the embodiment of the present invention.

A content complex providing server 70 in accordance with an embodiment of the present invention is illustrated in FIG. 10. The content complex providing server 70 according to this embodiment includes a video server 74 and an object server 75.

As shown in FIG. 10, the video server 74 receives a video type constituent content in a content complex 72, and transmits it to a first terminal 76 among terminals of a terminal group 78 in a video streaming manner.

Further, the object server 75 may receive a non-video type constituent content in the content complex 72, convert the non-video type constituent content into a web-based content by an operation of a web content conversion unit 76 in the object server 75, and transmit the web-based content to a second terminal 77 among terminals of the terminal group 78 by using a HTTP protocol. The object server 75 may also transmit the web-based content by using an application layer protocol other than the HTTP protocol. The object server 75 may also transmit the web-based content by using a real-time transport protocol such as RTP and RTSP.

The web content conversion unit 76 may parse a non-video type constituent content, decompose the non-video type constituent content into items such as an image, text, and 3D object, and generate a web document including the items. In order to include items other than the text in the web document, a technology for creating various web documents may be applied. For example, a scripting technology such as Java script, PHP, and ASP, a 3D representation technology such as OpenGL and Web GL and the like may be used. In this regard, since there is a variety of prior art, a detailed description thereof will be omitted.

It is difficult to expect that all reader programs of various content types are installed in the terminal of the terminal group 78, but it can be considered that a web browser program is generally installed. Therefore, the content complex providing server 70 according to this embodiment provides an effect of ensuring compatibility of the playback of the content complex by converting a non-video content into a web-based content and playing the web-based content through the web browser.

A method of providing a content complex in accordance with an embodiment of the present invention will be described with reference to FIGS. 11 to 14.

Figure 11:
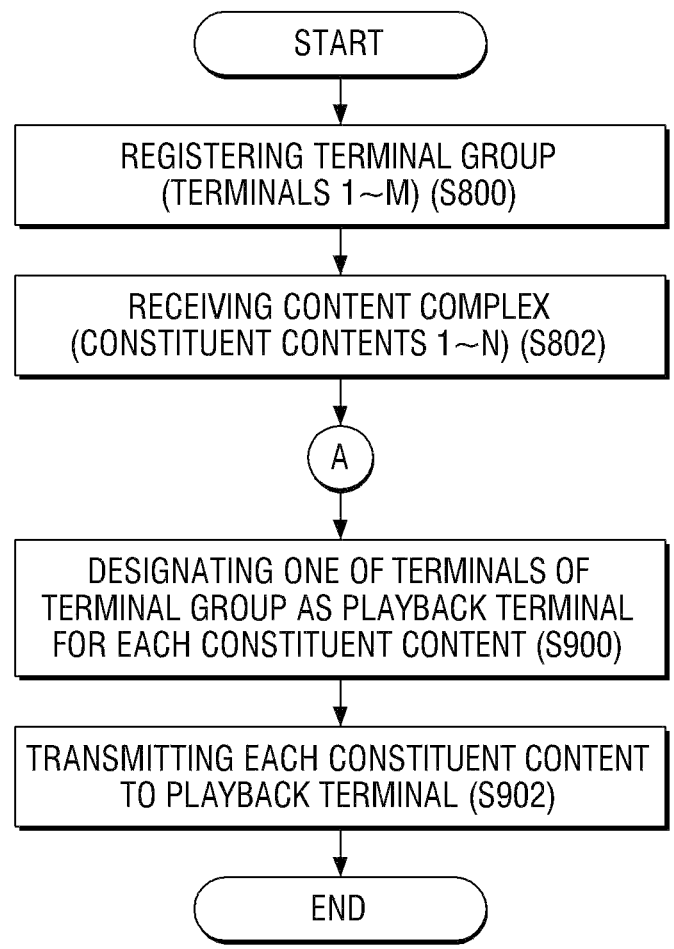
FIG. 11 is a flowchart of a method of providing a content complex in accordance with an embodiment of the present invention.

First, FIG. 11 illustrates a flowchart of a method of providing a content complex in accordance with the embodiment of the present invention. It can be understood that the flowchart shown in FIG. 11 shows operations performed by a content providing system which transmits the content complex to a plurality of terminals. The content providing system may be configured as one server system connected physically, or two or more server systems connected by a network.

First, the content providing system registers a terminal group including a plurality of terminals (S800). The information about the terminals included in one terminal group may be received from an external device, e.g., a terminal in which the user logs in to the service. That is, the content providing system may perform a request operation if at least one of a registration request and a login request of a specific user is received from a login terminal, receive information about terminals included in the terminal group from the login terminal, and store relevant data by registering the terminal group as a terminal group of the specific user. Two or more terminals may be included in one terminal group. The terminal group may also include two or more terminals of the same model, but may also include two or more terminals of different models. The information about the model of each terminal may be stored in the form of model identification information.

If it is difficult to collect the model identification information, the information about the model of each terminal may be stored in the form of model characteristics information to be generated by allowing the user to directly input the characteristics of the model. The characteristics of the model are determined by inputting values corresponding to items of, e.g., a display size, resolution, computing power and input means. The value of model characteristics information may be determined by a combination of at least one of a display size, resolution, computing power and input means, and stored. That is, the terminals included in one terminal group may be constituted by two or more models with different model characteristics.

Next, the content providing system receives the content complex including a plurality of different constituent contents (S802). The content complex may also be provided from another content server system, and uploaded from a user terminal. It is preferable that the content providing system receives and stores the content complex. A storage device storing the content complex may be included in the content providing system, or may be an external storage device connected to the content providing system via a network.

Although a case where the terminal group is registered first (S800), and then the content complex is provided (S802) has been illustrated in FIG. 11, it should be noted that, on the contrary, the content complex may be provided first and the terminal group may be registered.

Then, the content providing system distributes and provides the content complex to the terminals belonging to the terminal group. An operation related to this will be described.

First, the content providing system designates which terminal will receive each constituent content included in the content complex (S900). That is, each constituent content included in the content complex is transmitted to one of the terminals belonging to one terminal group and played through the terminal.

If the playback terminal for each constituent content is designated, each constituent content is transmitted to the corresponding playback terminal (S902).

The method of providing a content complex according to this embodiment has been described generally. Hereinafter, the method of providing a content complex according to this embodiment will be described in more detail with reference to FIGS. 12 to 14.

Figure 12:
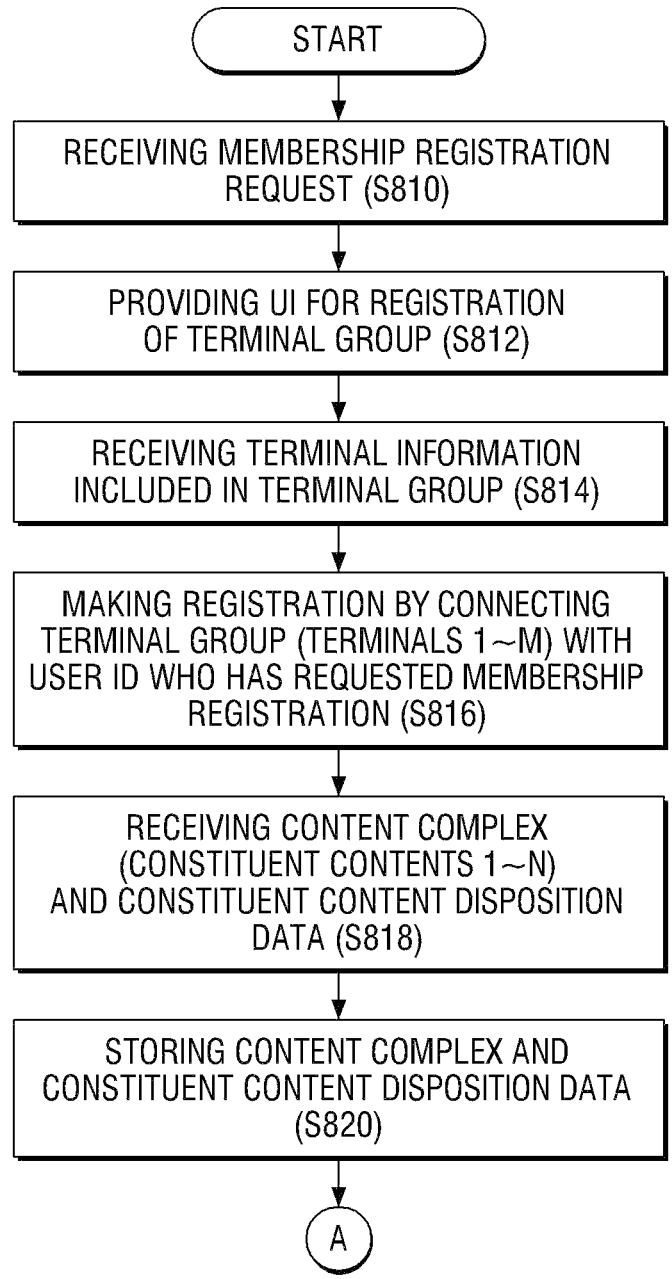
FIG. 12 is a detailed flowchart of steps of registering a terminal group and storing data in the method of providing a content complex in accordance with the embodiment of the present invention.

FIG. 12 is a detailed flowchart of steps of registering a terminal group and storing data in the method of providing a content complex according to the present embodiment.

A membership registration may be required to use a content complex providing service provided by the method of providing a content complex according to the present embodiment. Further, in the membership registration, each subscriber may be requested to register a plurality of terminals to be used in the playback of the content complex as one terminal group. That is, the content providing system may receive a membership registration request (S810) and provide a user interface (UI) for the registration of the terminal group (S812). If a subscriber inputs information on each terminal to be included in the terminal group, e.g., terminal model identification information or the model characteristics information through the user interface (UI) for the registration of the terminal group, the content providing system may receive the information inputted through the user interface (UI) (S814), make a registration by connecting the terminal group with a user ID who has requested the membership registration, and store the relevant data (S816).

Meanwhile, the content providing system may receive the content complex (S818) and store the content complex (S820). As described already with reference to FIGS. 4 and 5, all of the constituent contents included in the content complex may not be necessarily played always for the entire playback duration of the content complex. That is, each constituent content may be disposed in the content complex based on the timeline that is a flow of time according to the playback of the entire content complex. For example, in two or more of the constituent contents, the playback start time and the playback end time may be assigned such that the playback times overlap at least in part.

The content complex may include a playback schedule data such that each constituent content can be played at an appropriate time point in each terminal according to the arrangement of the constituent contents. That is, the content providing system may further receive a playback schedule data including information on the playback start time and the playback end time of each constituent content assigned based on the timeline that is a flow of time according to the playback of the entire content complex.

The content providing system may manage the progress of the timeline of the content complex, and transmit the information about the progress of the timeline to each terminal included in the terminal group. For example, when receiving a request for one of pause, stop and play of the timeline from one of the terminals included in the terminal group, the content providing system may change the state of the timeline and transmit the changed state of the timeline to a plurality of terminals included in the terminal group. Further, when receiving a request for changing the playback position on the timeline from one of the terminals included in the terminal group, the content providing system may change a current playback position value on the timeline, and transmit the changed current playback position value of the timeline to a plurality of terminals included in the terminal group.

As described already with reference to FIG. 6, the content complex may include one or more interactive constituent contents. The interactive constituent contents mean contents configured such that the UI for an input of the user is provided, an input of the user is received through the UI, and an operation is performed in response thereto. According to one embodiment of the present invention, the operation corresponding to the input through the UI may be a playback through another terminal of another constituent content.

In this case, for the playback of the content complex, there is a need for interactive specification data that is data corresponding to a specific input for the user interface UI and a specific operation performed for one or more target contents specified in the constituent contents other than the interactive content. Accordingly, the content providing system may further receive the interactive specification data.

Figure 13:
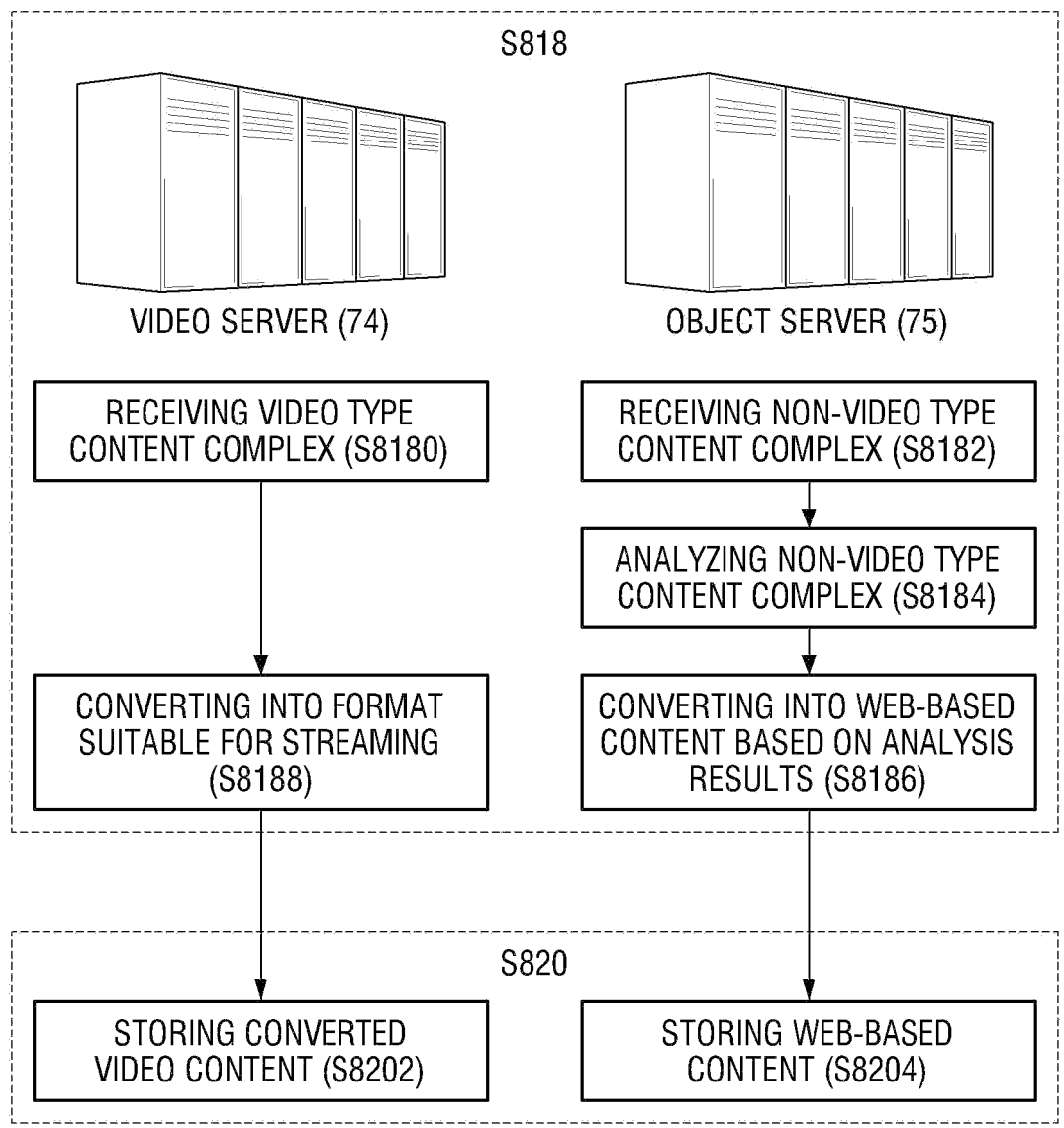
FIG. 13 is a detailed flowchart of the step of storing data in the method of providing a content complex in accordance with the embodiment of the present invention.

FIG. 13 shows a flowchart of the operations of receiving the content complex (S818) and storing the content complex (S820) of FIG. 12, and it has been described in more detail by dividing the constituent contents of the content complex into a video type constituent content and a non-video type constituent content.

As previously described, the content complex may constitute different types of constituent contents. That is, at least one of the constituent contents included in the content complex may be of a type different from the other constituent contents. For example, a video type constituent content and a non-video type constituent content may constitute one content complex. As one example, the content complex may include one main constituent content of a video type and a subsidiary constituent content of a non-video type that is an attached data of the main constituent content.

The content providing system may include the video server 74 in charge of the video type and the object server 75 in charge of the non-video type.

First, the video server 74 may receive a video type constituent content (S8180), and convert the received video type constituent content into a format suitable for streaming (S8188). Converting into a format suitable for streaming may mean, for example, reducing the resolution of the video, reducing the frame rate, or converting a codec of the video into a codec suitable for streaming. A video server 64 stores the converted video content (S8202).

Converting into a format suitable for streaming (S8188) is performed selectively, and the received video type constituent content may also be transmitted directly to the terminal.

As described with reference to FIG. 10, the non-video type constituent content may be converted into a web-based content and transmitted to the terminal in the form of a web-based content. That is, after receiving a non-video type constituent content (S8182), the object server 75 performs an analytical operation to decompose the constituent content into items such as a text, image, and 3D object through parsing, and converts the non-video type constituent content into a web-based content on the basis of the results of the analysis (S8186). Converting into a web-based content (S8186) may mean generating a web document file created such that the non-video constituent content is played if it is accessed by a web browser program installed in the playback terminal, and an object file embedded in the web document. Further, the object server 75 stores a web-based content constituted by the web document file and the object file (S8204).

Figure 14:
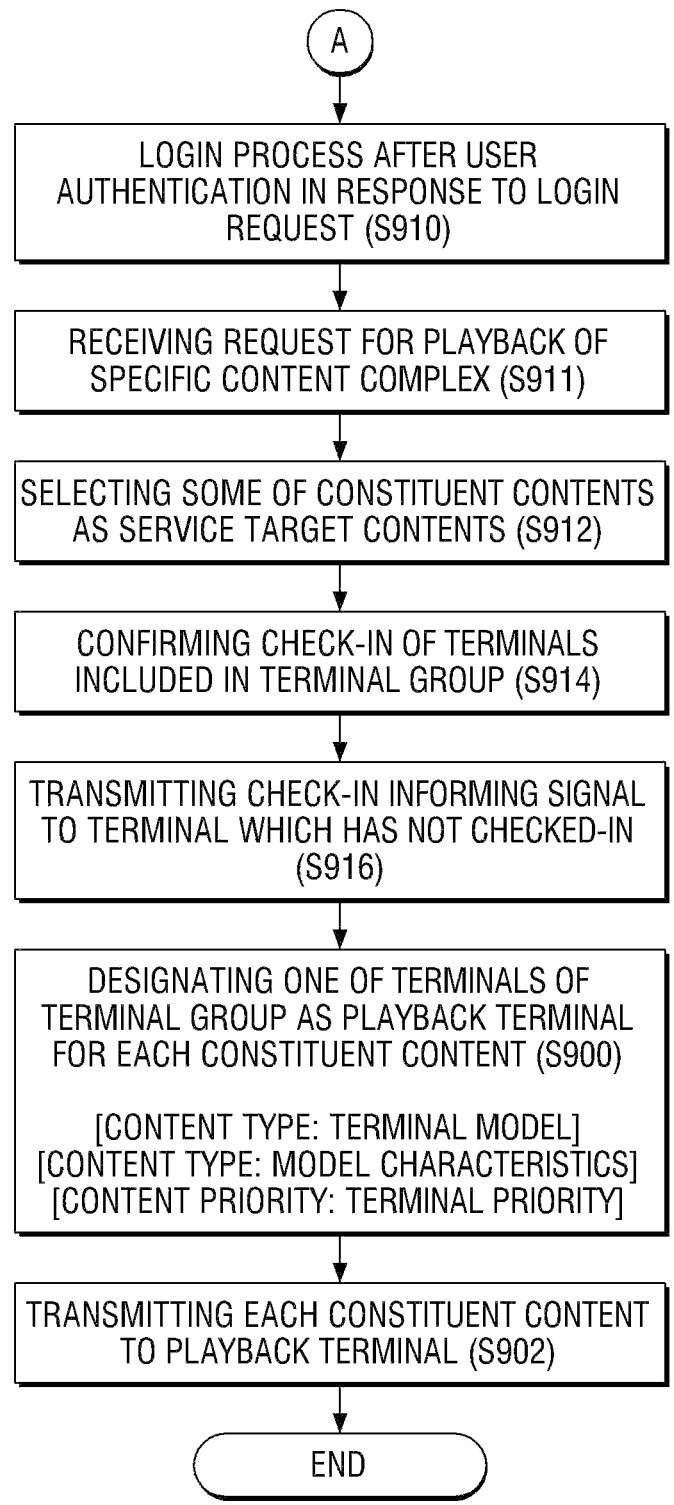
FIG. 14 is a detailed flowchart of the step related to transmission of the content complex in the method of providing a content complex in accordance with the embodiment of the present invention.

Next, a detailed operation of the steps involved in transmitting the content complex in the method of providing a content complex according to this embodiment will be described with reference to FIG. 14.

In order to provide the content complex, the user may need to perform a login operation in advance. This is because it is possible to confirm the terminal group of the user through the login. Therefore, the content providing system may perform a login process in response to a login request (S910). By receiving a request for playback of a specific content complex from the login user (S911), a series of preparation operations for transmission of the content complex that has been requested to be played are performed (S912 to S916, S900, S902).

Further, all constituent contents included in the content complex may not need to be played. For example, if the constituent content for men and the constituent content for women are included in one content complex, only one of the constituent content for men and the constituent content for women may be played.

Further, the number of the terminals included in the terminal group may be less than the number of the constituent contents included in the content complex. For example, even if the number of the constituent contents included in one content complex is five, it will be hard for the number of the terminals owned by one person to become five, and only a part of the five constituent contents may be selected and played.

Thus, the content providing system may select some of the constituent contents included in the content complex as service target contents (S912), and allow only the service target contents among the constituent contents to be played in one of the terminals included in the terminal group of the login user, which is designated as a playback terminal.

Selecting the service target contents (S912) may be performed selectively, but it is preferable to requisitely perform S912 if the number of the constituent contents of the content complex is greater than the number of terminals included in the terminal group.

The content providing system may select the service target contents based on the attribute values of the login user. That is, the content providing system may select some of the constituent contents of the content complex as service target contents using at least one of the attribute values included in the membership information of the login user. The attributes may be, e.g., gender, age, address, interest, education, occupation and institution.

If the constituent contents of the content complex are divided into one or more common contents and a plurality of selection contents, the common contents are included unconditionally and selection of the service target contents may be performed only for the selection contents. That is, the content providing system may select the common contents and the selection contents corresponding to the attribute values of the first user, among the selection contents included in the content complex, as the service target contents.

Then, the content providing system may confirm whether all of the terminals included in the terminal group of the login user have checked-in (S914), and transmit a check-in guidance signal to the terminal which has not checked-in (S916). The check-in may be, e.g., whether to execute an application for playing the content complex installed in the terminal, or whether a check-in button has been pressed after the execution of the application. The content providing system may determine that preparation for playing the content complex has been made only for the terminals which have checked-in among the terminals belonging to the terminal group, and select the playback terminal of each constituent content among the terminals which have checked-in.

To organize the operations related to the check-in, the content providing system may receive a check-in request from one of the terminals constituting the terminal group, and designate one of the terminals which have transmitted the check-in request, as a playback terminal, for each of the constituent contents included in the content complex. The content providing system may transmit a check-in guidance signal to the terminals which have not transmitted the check-in request among the terminals constituting the terminal group (S916).

Then, the content providing system may designate the playback terminal for each of the constituent contents included in the content complex (S900). The playback terminal may be designated from among the terminals belonging to the terminal group, and may be designated from among the terminals in which the check-in has been confirmed, particularly, if a check-in confirmation process S916 and S918 is performed.

The content providing system may designate a terminal having model identification information corresponding to the type of the constituent content as a playback terminal. For example, for the constituent content of a video type, one of the terminals having model identification information of the model, which is classified as a tablet PC, may be designated as a playback terminal, and for the constituent content of a presentation material type, one of the terminals having model identification information of the model, which is classified as a smart phone, may be designated as a playback terminal.

The content providing system may also designate the terminal having model characteristics corresponding to the type of the constituent content as a playback terminal. For example, for the constituent content of a video type, one of the terminals having model characteristics in which the size of the display is equal to or greater than 7 inches may be designated as a playback terminal. For the constituent content of a presentation material type, one of the terminals having computing power of more than dual-core may be designated as a playback terminal. For the constituent content of an interactive video type, one of the terminals having model characteristics including a touch pad as an input means may be designated as a playback terminal.

The content providing system may designate the playback terminal based on the priority. That is, different priorities are specified in the constituent contents included in the content complex, and different priorities are specified in the terminals included in the terminal group. The content providing system may designate a terminal with a priority corresponding to a priority of the constituent content as a playback terminal.

The content providing system may transmit each constituent content to the playback terminal thereof (S902). At the transmission (S902), the transmission can be made immediately after specifying the playback terminal (S900) has been completed, but the constituent contents may be transmitted respectively in accordance with the playback start time of each constituent content included in the playback schedule data of the content complex. In this case, the application for playing the content complex is implemented such that each playback terminal plays the received constituent contents as the constituent contents are received from the content providing system.

Figure 15:
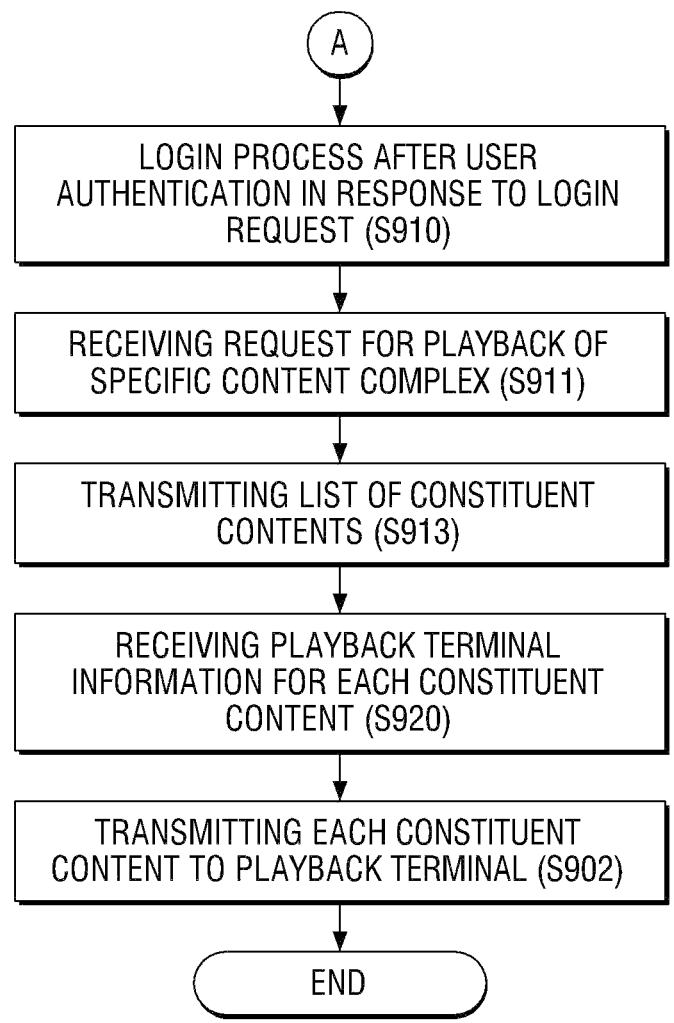
FIG. 15 is a flowchart of the method of providing a content complex in accordance with the embodiment of the present invention.

A method of providing a content complex in accordance with an embodiment of the present invention will be described with reference to FIG. 15. The method of providing a content complex illustrated in FIG. 15 is different from the method of providing a content complex shown in FIGS. 11 to 14 in that the playback terminal of each constituent content is specified directly by the user.

In the content providing system according to this embodiment, since the steps of registering a terminal group and storing data in the method of providing a content complex shown in FIG. 12 are the same as those of the method of providing a content complex shown in FIGS. 11 to 14, a repeated explanation will be omitted. That is, FIG. 15 shows an operation of the content providing system after the registration of the terminal group in accordance with the membership registration of the user and the storage of the content complex have been completed.

The content providing system processes a login request (S910), and when receiving a request for playback of a specific content complex (S911), it transmits a list of the constituent contents constituting the specific content complex through a service page on which the login request is performed (S913). The list may be transmitted to a terminal which has performed the login. The terminal which has performed the login may be a terminal belonging to the terminal group.

The content providing system may set, as a recommendation terminal, a terminal having model identification information corresponding to the type of the constituent content among the terminals included in the terminal group of the login user, and transmit a list of the constituent contents including the recommendation terminal information to one of the terminals of the terminal group.

The content providing system receives a playback terminal specifying signal to specify one of the terminals of the terminal group as a playback terminal for each of the constituent contents in response to transmission of the list of the constituent contents (S920). Then, the content providing system transmits each constituent content to the playback terminal thereof (S902).

The method of providing the content complex according to this embodiment has an effect in which the user can directly designate a terminal to play each constituent content included in the content complex.

A configuration and operation of a content complex playback system in accordance with an embodiment of the present invention will be described with reference to FIG. 16.

An operation of a content complex reproduction system 80 according to this embodiment will be described assuming a situation where a virtual service subscriber "A" has a first terminal 76 and a second terminal 77 of a model different from the first terminal 76 as its terminal group 78, and makes a request for playback of a content complex 82 including a video "Y" and a presentation material "Z."

The content complex reproduction system 80 according to this embodiment includes the content complex providing server 50 which receives a playback request signal of the content complex 82 including a first constituent content Y and a second constituent content Z of a content type different from the first constituent content, designates the first terminal 76 as a playback terminal of the first constituent content Y, transmits the first constituent content Y to the first terminal 76, designates the second terminal 77 as a playback terminal of the second constituent content Z, and transmits the second constituent content Z to the second terminal 77. Hereinafter, an operation of the content complex providing server 50 will be described in more detail.

The timeline 110 of the content complex 82 is illustrated in FIG. 15. According to the timeline 110, a total playing time of the content complex 82 is 60 minutes, the playback of the second constituent content Z is started at a time point of 30 minutes and 10 seconds, the playback of the second constituent content Z is terminated at a time point of 40 minutes and 10 seconds, and the first constituent content Y is played continuously for the playback duration of the content complex 82. The content complex providing server 50 may receive playback schedule data including the information on the playback start time and the playback end time of each constituent content assigned based on the timeline 110 that is a flow of time according to the playback of the entire content complex 82.

If "A" makes a login request through the first terminal 76 (S100), the content complex providing server 50 processes the login (S102). Then, when "A" makes a request for playback of the content complex 72 through a first terminal 66 (S104), the content complex providing server 50 designates the playback terminals of the first constituent content Y and the second constituent content Z (S106), transmits the playback schedule data based on the timeline 110 of the first constituent content Y to the first terminal 76 (S108), and transmits the playback schedule data based on the timeline 110 of the second constituent content Z to the second terminal 77 (S110). Immediately afterwards, the content complex providing server 50 transmits streaming data of the first constituent content Y to the first terminal 76 (S112), and starts the playback of the content complex 82 (S114).

Figure 16:
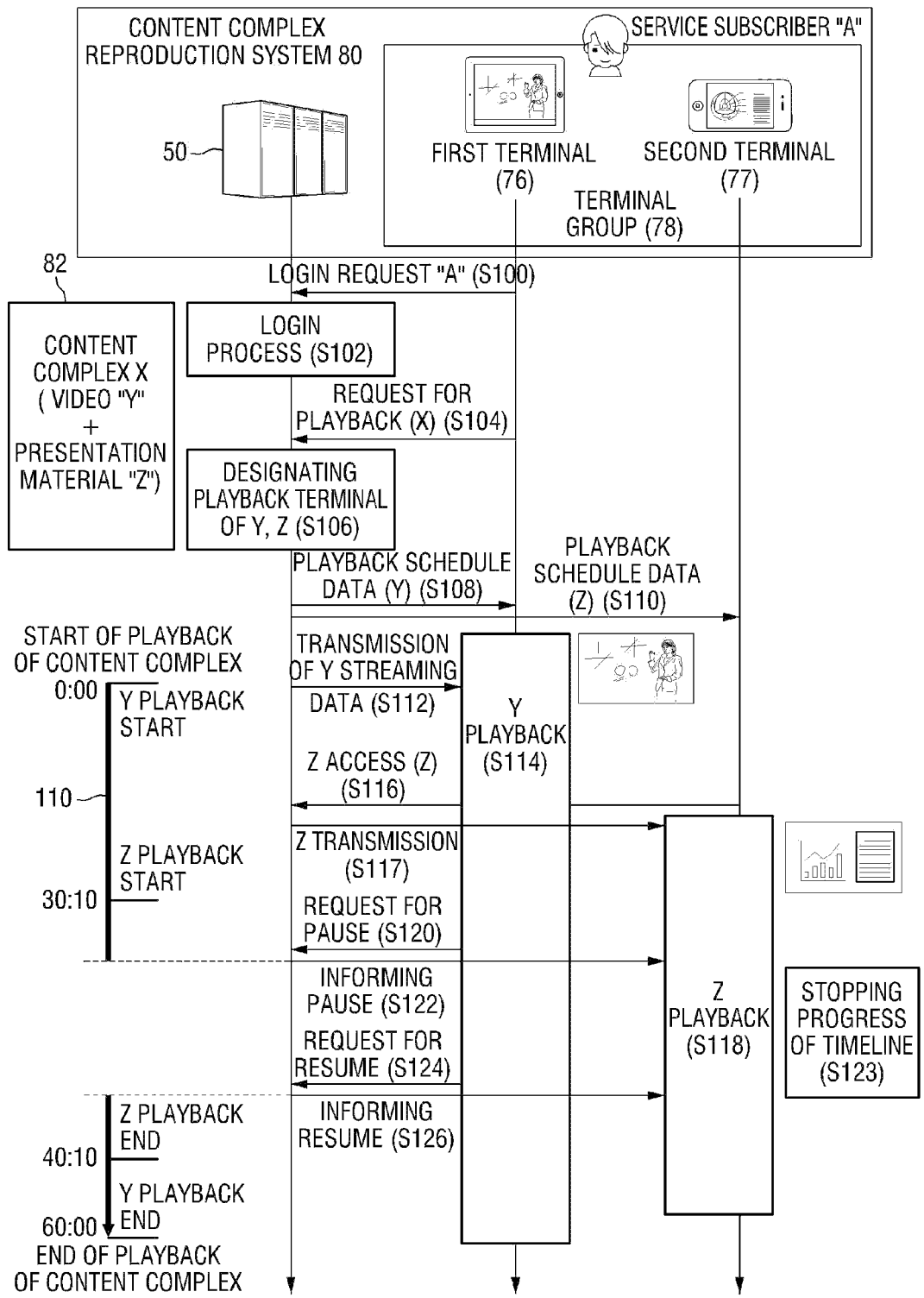
FIG. 16 is a diagram for explaining an operation of a content complex providing system in accordance with an embodiment of the present invention.

Although a case where the playback of the first constituent content Y is also started at the start of playback of the first constituent content Y has been illustrated in FIG. 16, the playback of the first constituent content Y may not be started at the start of playback of the content complex. In this case, the application for playing the content complex installed in the first terminal 76 may start the playback of the first constituent content when it reaches the playback start time of the first constituent content included in the playback schedule data.

Meanwhile, since the second constituent content Z is a non-video type constituent content, the content complex providing server 50 converts the second constituent content Z into a web-based content, and transmits address information that can be accessed to the web-based content to the application for playing the content complex of the second terminal 77, and the application for playing the content complex of the second terminal 77 accesses the web-based content by using the address information when it reaches the playback start time of the second constituent content Z included in the playback schedule data (S116). As the application for playing the content complex of the second terminal 77 accesses the web-based content, the web-based content data may be received (S117), and the second constituent content Z may be played in the application for playing the content complex of the second terminal 77 (S118).

Meanwhile, "A" may request a pause during playback of the content complex 72 through the first terminal 76 (S120). The content complex providing server 50 may pause the progress of the timeline 110, and guide it to the second terminal 77 (S122). The second terminal 77 may stop the progress of the timeline (S123) until a resume request (S124) through the first terminal 76 is transmitted through the content complex providing server 50 (S126).

That is, the content complex providing server 50 may receive a request for changing a playback state meaning one of play, pause, stop, and play position change from one of the first terminal 76 and the second terminal 77 (S120, S124), manage such that the current playback time and playback state on the timeline 110 that is a flow of time according to the playback of the entire content complex 82 are updated in real time, and transmit the updates of the timeline 110 to the terminal 77, which does not transmit a request for a change in the playback state, of the first terminal 76 and the second terminal 77.

According to some embodiments of the present invention, the content complex providing servers 50 and 70 providing the content complex may include a cloud server module which supports a cloud computing function. That is, the content complex is uploaded in the content complex providing servers 50 and 70 from one of the terminals belonging to the terminal group of a specific user, and the content complex may be played through the terminal belonging to the terminal group. The upload may be performed manually by the user, may be performed periodically, and may be performed automatically without the user's terminal operation for the upload simultaneously with the creation of the content complex.

Meanwhile, according to some embodiments of the present invention, the constituent content may mean an object included in one content complex. For example, a MPEG4 content may be configured on an object basis, and the object includes a video, audio and the like. Therefore, the MPEG4 content may be an example of the content complex, and an object such as audio and video included in the MPEG4 content may be played in different terminals. For example, if one terminal group includes terminal A having excellent video playback performance and terminal B having excellent audio playback performance, the video of the MPEG4 content may be divided and played through the terminal A, and the audio of the MPEG4 content may be divided and played through the terminal B.

Figure 17:
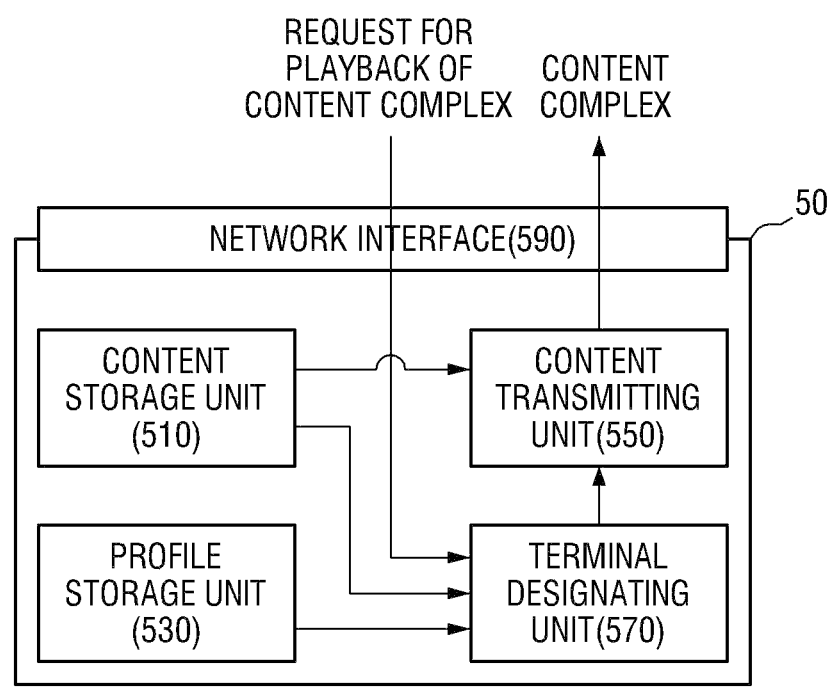
FIG. 17 shows a block diagram of a content complex providing server in accordance with embodiments of the present invention.

FIG. 17 is a block diagram of a content complex providing server in accordance with another embodiment of the present invention. As shown in FIG. 17, the content complex providing server 50 may include a content storage unit 510, a profile storage unit 530, a terminal designating unit 570, and a content transmission unit 550. The content complex providing server 50 according to the present invention may further include a network interface 590. The network interface 590 transmits/receives data to/from the terminals included in the terminal group of the user. Particularly, the network interface 590 receives a request for playback of the content complex stored in the content storage unit 510 from one of the terminals included in the terminal group, and distributes and provides the constituent content included in the content complex, which are requested to be played, to the terminals included in the terminal group according to the control of the content transmission unit 550.

The content complex providing server 50 may designate the playback terminals of the constituent content such that the constituent content and the terminals have a one-to-one relationship. Further, the playback terminals of the constituent content may be designated such that some of the constituent content has two or more playback terminals. However, it is preferable that the content complex providing server 50 designates the playback terminals to avoid a case where there is any terminal which does not play the constituent content or a case where all terminals play the same constituent content.

The content storage unit 510 stores package data of the content complex including the first constituent content and the second constituent content. The content complex may further include one or more constituent content such as third and fourth constituent content other than the first and second constituent content. That is, the content complex may include two or more different constituent content.

The profile storage unit 530 stores profile information of the user of each service. The profile information may include personal information that has been entered when registering the service, dynamic attribute information assigned according to the use of the service, and the like. The dynamic attribute information may include a member level, grade, and the like. Further, the profile information may include information on the terminal group corresponding to the user. The terminal group may include at least a first terminal and a second terminal. The information on the terminal group may include access information or identification information on the terminals included in the terminal group, information about specifications, and type codes of each terminal of the terminal group. The information about specifications may include information about parts for the audiovisual data presentation, such as screen resolution.

The terminal designating unit 570 designates the playback terminals of the constituent content included in the content complex from among the terminals included in the terminal group of the specific user in response to a request for playback of the content complex received from the specific user. In the case of a specific constituent content, it may be excluded from the objects to be played since no playback terminal is designated, or a plurality of playback terminals may be designated. The terminal designating unit 570 may provide information on the playback terminals of the constituent content to the content transmission unit 550. The terminal designating unit 570 may refer to the information about specifications of terminals, or type codes of the terminals included in the profile information in order to designate the playback terminal corresponding to the attribute of each of the constituent content.

The terminal designating unit 570 may designate one or more of the first terminal and the second terminal included in the terminal group of the specific user as the playback terminal of the first constituent content, and one of the first terminal and the second terminal included in the terminal group of the specific user as the playback terminal of the second constituent content. Preferably, the terminal designating unit 570 designates the playback terminals such that each of the first terminal and the second terminal plays at least one of the constituent content.

The content transmission unit 550 may transmit the constituent content included in the content complex to the playback terminals. The information on the playback terminals may be received from the terminal designating unit 570. The content transmission unit 550 may transmit the constituent content by using application layer protocols such as HTTP (HyperText Transfer Protocol), RTP (Real-time Transport Protocol), and RTSP (Real Time Streaming Protocol). The content transmission unit 550 may include, e.g., a media server module or web server engine.

Hereinafter, a configuration and operation of the content complex providing server in accordance with a first embodiment of the present invention will be described. The content complex providing server according to the first embodiment may provide a main content to which an advertising content has been added. Further, the content complex providing server according to the first embodiment may be configured to include the content storage unit 510, the profile storage unit 530, the terminal designating unit 570 and the content transmission unit 550 as shown in FIG. 17. Hereinafter, a configuration of the content complex providing server 50 according to the first embodiment will be described in more detail.

The content storage unit 510 stores package data of the content complex including a main content and a first advertising content. The content complex may further include one or more advertising content other than the first advertising content.

The profile storage unit 530 stores profile information of the user, and the profile information includes information on the terminal group including a plurality of terminals. In the following description, for convenience of explanation, a specific user among the users is referred to as a first user.

Meanwhile, the user having received the content complex in a manner according to this embodiment may be limited to a user who has given prior consent to agreement of changing a predetermined method of receiving advertisements. That is, the first user may be a user who has given prior consent to agreement of changing a predetermined method of receiving advertisements. A second user who has not given prior consent to the agreement may receive advertisements added to the main content in the existing manner. That is, the content transmission unit 550, in response to a request of the second user who has not given prior consent for playback of the content complex, may sequentially transmit the main content and the first advertising content, or transmit the first advertising content to be embedded in the main content to the terminal of the second user.

The terminal designating unit 570, in response to the first user's request for playback of the content complex, may designate one or more terminals among the terminals of the terminal group as the playback terminal(s) of the main content, designate one or more terminals among the remaining terminals, which are not designated as the playback terminal(s) of the main content, as the playback terminal(s) of the first advertising content, and provide the information on the playback terminals of the content included in the content complex to the content transmission unit 550.

The content transmission unit 550 receives the information on the playback terminals from the terminal designating unit 570, and transmits the main content and the first advertising content to the playback terminals.

The content complex providing server 50 according to this embodiment transmits the advertising content added to the main content as well as the main content to the user having a plurality of terminals. However, the advertising content is played through a terminal different from the terminal for playing the main content. Accordingly, there is an effect that the user can receive advertisements in a manner not to interfere with playback of the main content.

Meanwhile, from an advertiser's perspective, it is important to ensure the advertising content being played correctly. In this embodiment, since the main content and the advertising content are played in different terminals, the user may play only the main content and avoid the playback of the advertising content. In order to prevent this problem, the content complex providing server 50 according to this embodiment may check whether the playback terminal of the first advertising content is normally operated. For example, the content transmission unit 550 may periodically receive an ACK signal from the playback terminal of the first advertising content, and interrupt the transmission of the main content if the ACK signal is not received a predetermined number of times or more.

The content complex providing server 50 according to this embodiment may automatically transmit the advertising content corresponding to the timeline of the main content without the user's request. This will be described with reference to FIG. 4.

An advertisement-containing content complex 100 is shown in FIG. 4. The advertisement-containing content complex 100 includes a main content 101 to be played during the entire sections of a timeline 110, and advertising content 103 and 105 to be played in particular time zones of the timeline 110. For example, if the main content 101 is drama to be broadcasted on television, the advertising content 103 and 105 may be advertising content related to a specific scene in the drama.

Figure 18:
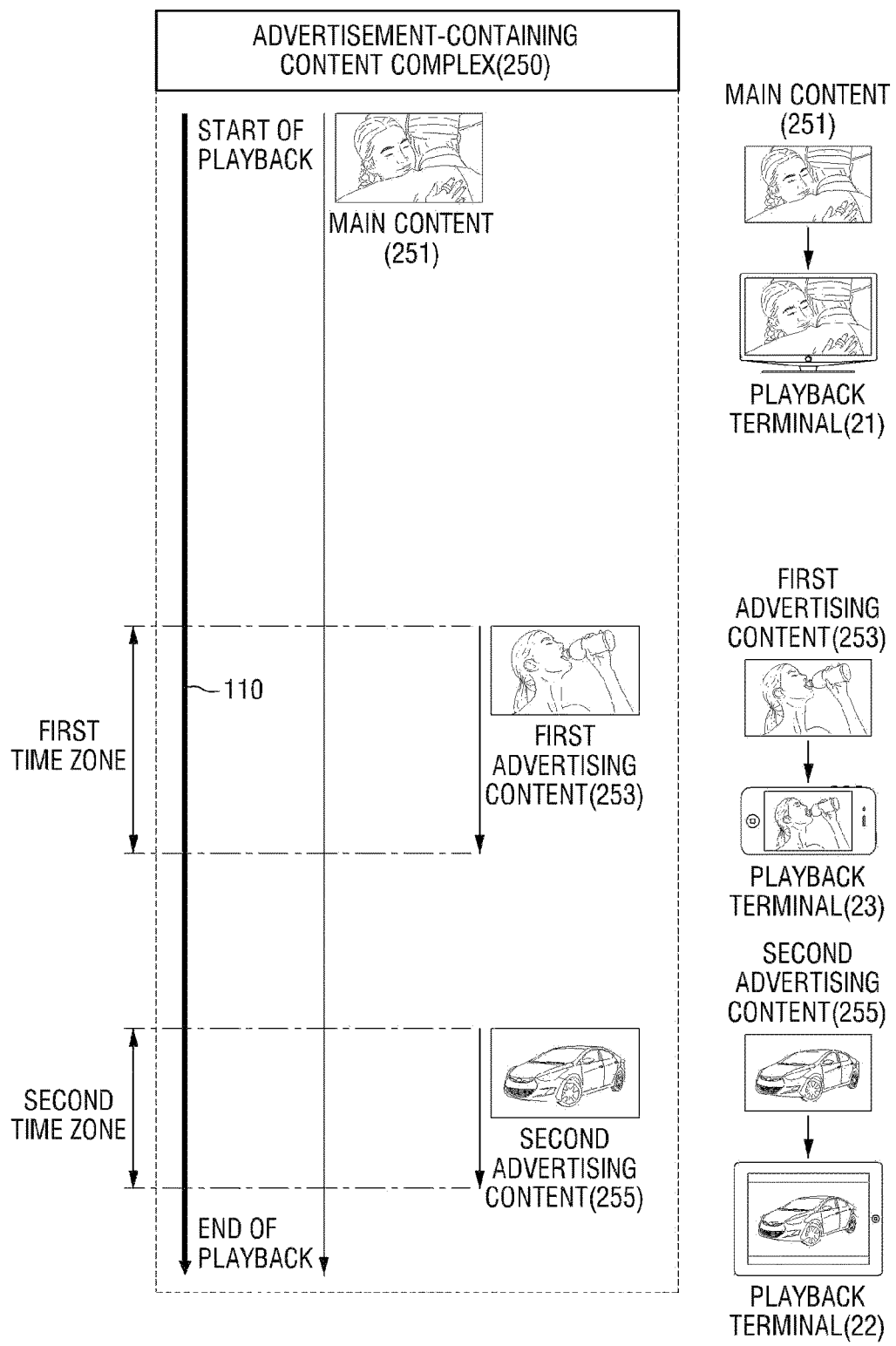
FIG. 18 is a diagram schematically showing a configuration example of an advertisement-containing content complex provided from a content complex providing server in accordance with a first embodiment of the present invention.

FIG. 18 illustrates a situation where the advertisement-containing content complex 250 includes, in addition to the main content 251, a first advertising content 253 and a second advertising content 255, and the user who has requested the playback of the content complex 250 has registered three terminals 21, 22 and 23. As described above with reference to FIG. 17, the terminal designating unit 570 of the content complex providing server 50, in response to the request for playback of the content complex, may designate one terminal 21 among the terminals of the terminal group as the playback terminal of the main content 251, and designate the remaining terminals 23 and 22, which are not designated as the playback terminal of the main content, as the playback terminals of the first and second advertising content 253 and 255. Unlike the configuration illustrated in FIG. 18, one of the terminals 23 and 22 other than the playback terminal 21 of the main content 251 may play all of the first advertising content 253 and the second advertising content 255.

If the user requests the playback of the advertisement-containing content complex 250 shown in FIG. 18, the content complex providing server 50 according to this embodiment may check a change of the timeline 110 according to the playback of the main content 251, transmit the first advertising content 253 to the playback terminal 23 of the first advertising content in a first time zone of the timeline 110, and transmit the second advertising content 255 to the playback terminal 22 of the second advertising content in a second time zone.

According to an embodiment, the content complex providing server 50 may transmit the first and second advertising content in advance regardless of the timeline of the main content. Then, the playback terminals of the first and second advertising content may further receive the timeline from the content transmission unit, play the first advertising content in the first time zone, and play the second advertising content in the second time zone.

Figure 19:
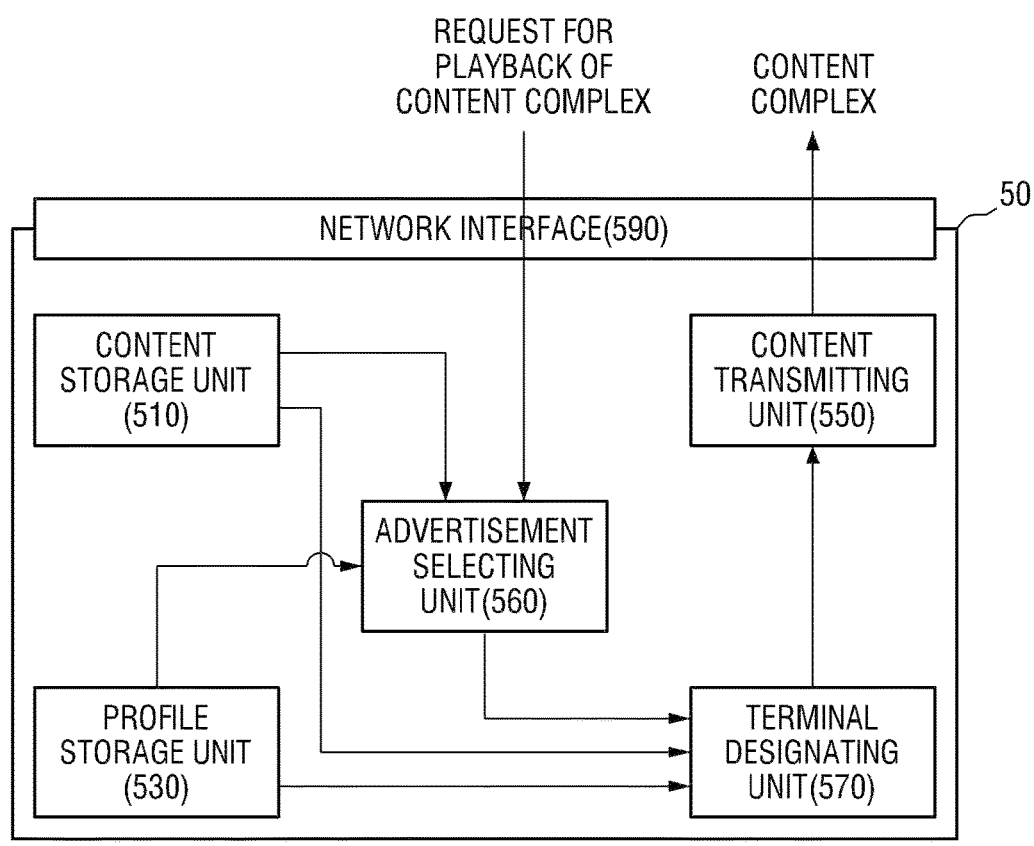
FIG. 19 shows an exemplary block diagram of the content complex providing server in accordance with the first embodiment of the present invention.

The content complex providing server 50 according to the first embodiment of the present invention may select some of a plurality of advertising content included in the content complex as advertisement executing content, and provide only the advertisement executing content to the playback terminal. The content complex providing server 50 having such configuration is shown in FIG. 19. Hereinafter, a configuration and operation of the content complex providing server 50 shown in FIG. 19 will be described. The content complex providing server 50 may include the content storage unit 510, the profile storage unit 530, the content transmission unit 550, the terminal designating unit 570 and an advertisement selecting unit 560.

The content storage unit 510 stores the main content, and package data of the content complex including the first and second advertising content each having advertisement target user requirement. For example, the first advertising content may have advertisement target user requirement as the male in twenties, and the second advertising content may have advertisement target user requirement as the female whose job is a student.

The profile storage unit 530 stores profile information of a first user, and the profile information includes information on a terminal group including a plurality of terminals, and personal information of the first user.

The advertisement selecting unit 560, in response to the first user's request for playback of the content complex, selects one or more content of the first and second advertising content as the advertisement executing content according to whether the profile information of the first user meets the advertisement target user requirement of the first and second advertising content, and provides information on the advertisement executing content to the terminal designating unit 570.

The terminal designating unit 570 receives information on the advertisement executing content, designates one or more terminals among the terminals of the terminal group as the playback terminals of the main content, designates one or more terminals among the remaining terminals, which are not designated as the playback terminals of the main content, as the playback terminals of each of the advertisement executing content, and provides information on the playback terminals of the main content and the advertisement executing content to the content transmission unit 550.

The content transmission unit 550 receives the information on the playback terminals of the main content and the advertisement executing content, and transmits the main content and the advertisement executing content to the playback terminals.

The content complex providing server 50 according to this embodiment has an effect of enabling targeted advertising according to the characteristics of the user who has requested the playback of the content complex. For example, the content complex including all of the first advertising content for men and the second advertising content for women is prepared in advance, and the advertising content corresponding to the gender of the user can be transmitted with reference to the personal information of the user who has requested the playback. The personal information of the user that can be referred to by the advertisement selecting unit 560 may be information, which is entered by the user or can be obtained, such as an age, location, occupation, and education as well as the gender.

Figure 20:
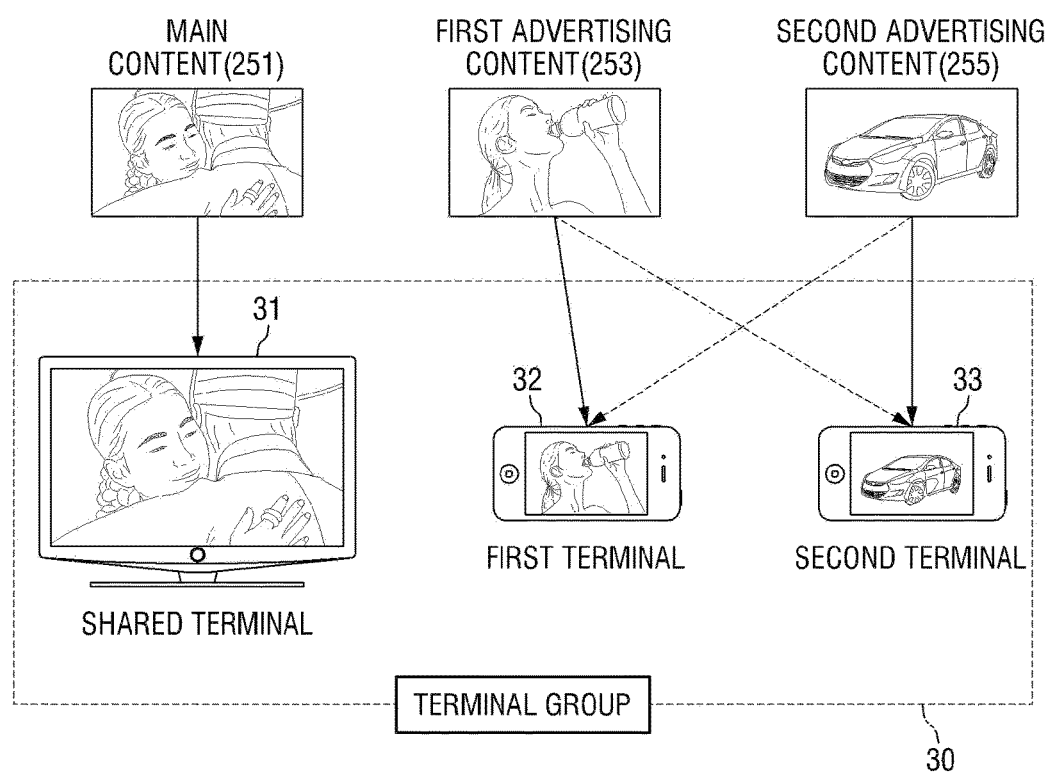
FIG. 20 is a diagram schematically showing an example in which playback terminals are designated in a terminal group including a shared terminal according to the operation of the content complex providing server in accordance with the first embodiment of the present invention.

The content complex providing server 50 according to this embodiment may be modified to support the terminal group in which a shared terminal and dedicated terminals are mixed together. For example, as shown in FIG. 20, a terminal group 30 may include a shared terminal 31, a first terminal 32 only for a first user, and a second terminal 33 only for a second user. The content complex providing server 50 may transmit the main content 101 to the shared terminal 31, transmit the first advertising content 253, in which the user condition to meet the personal information of the first user are specified, to the first terminal 32, and transmit the second advertising content 255, in which the user requirements to meet the personal information of the first user are specified, to the second terminal 33.

The content complex providing server 50 according to the above embodiment may include the content storage unit 51 which stores package data of the content complex containing the main content and the first and second advertising content corresponding to the requirements of the specific user, the profile storage unit 53 which stores information on the terminal group including the shared terminal to be used commonly, the first terminal only for the first user and the second terminal only for the second user, and profile information of the first user and the second user, the terminal designating unit 57 which, in response to a request for playback of the content complex, designates one or more terminals among the first terminal and the second terminal as the playback terminals of the first and second advertising content according to whether the profile information of the first user and the second user stored in the profile storage unit meets the user requirements of the first and second advertising content, and provides information on the playback terminals of the main content and the first and second advertising content to the content transmission unit, and the content transmission unit 55 which receives information on the playback terminals of the main content and the first and second advertising content, transmits the main content to the shared terminal, and transmits the first and second advertising content to the playback terminals.

Next, a content complex providing server in accordance with a second embodiment of the present invention will be described. The content complex providing server 50 according to the second embodiment supports a video conference or video call between users having a plurality of terminals. The content complex providing server 50 according to the second embodiment will be described with reference to FIG. 21.

The content complex providing server 50 may relay a video conference between the first user and the second user. It is assumed that each of the first user and the second user has three terminals. That is, it is assumed that the first user has registered a terminal group 40 including first to third terminals 41, 42 and 43 in the content complex providing server 50, and the second user also has registered a terminal group 60 including first to third terminals 61, 62 and 63 in the content complex providing server 50. The first terminal 41 of the first user and the first terminal 61 of the second user exchange their user videos according to the relay of the content complex providing server 50.

Meanwhile, at least one of the first user and the second user may upload in advance materials to be shared during the video conference in the content complex providing server 50. The uploaded materials may be transmitted from the content complex providing server 50 to the terminal on the other party who is present in the video conference. The uploaded materials may be configured in the form of the content complex containing at least one constituent content.

Figure 21:
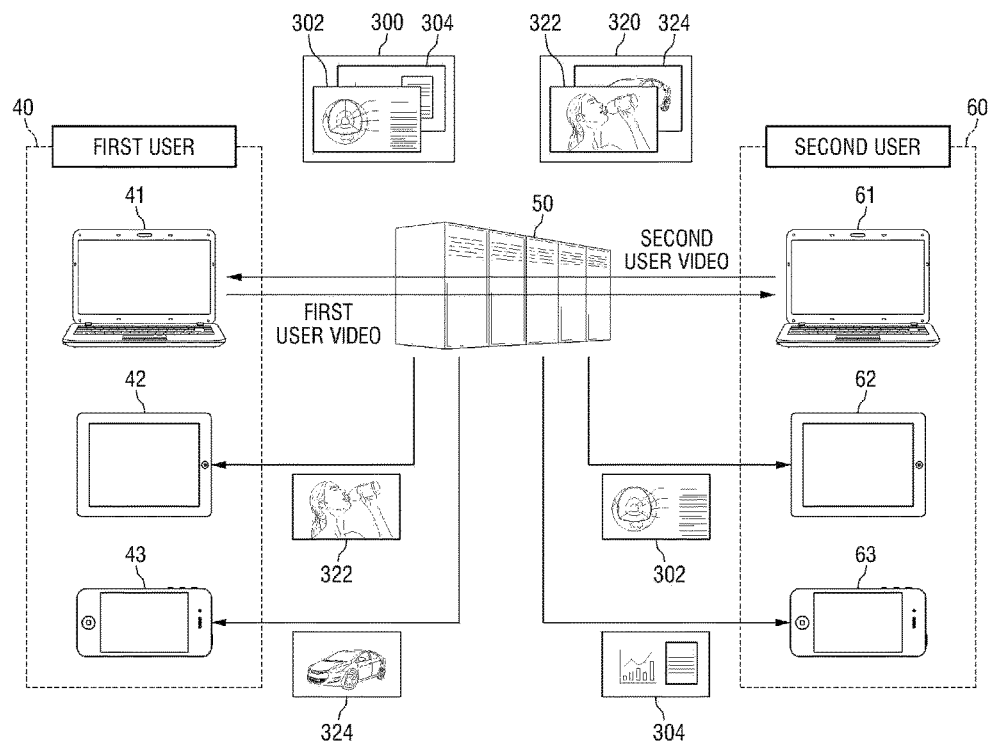
FIG. 21 is a conceptual diagram for explaining an operation of a content complex providing server in accordance with a second embodiment of the present invention.

As shown in FIG. 21, if the first user uploads a first content complex 300 containing a first constituent content 302 and a second constituent content 304 in the content complex providing server 50 in advance before the start of the conference, and the second user uploads a second content complex 320 containing a first constituent content 322 and a second constituent content 324 in the content complex providing server 50 in advance before the start of the conference, the content complex providing server 50 may transmit the first content complex 300 to the terminals 62 and 63 except the first terminal 61 used to exchange the user videos among the terminals of the second user, and may transmit the second content complex 320 to the terminals 42 and 43 except the first terminal 41 used to exchange the user videos among the terminals of the first user.

In the content complex providing server 50 according to this embodiment, if the party using the video conference has a terminal other than the terminal used in the video conference, by playing conference supplementary materials using the terminal, it is possible to easily share supplementary materials during the video conference, and allow the user to see the supplementary materials provided from the other party without cutting off the video of the other party of the video conference.

The content complex providing server 50 according to this embodiment includes the content storage unit 510 which stores package data of the first content complex containing the first constituent content and package data of the second content complex containing the second constituent content, the profile storage unit 530 which stores profile information of the first user and the second user, the profile information containing information on the terminal group including the first terminal and the second terminal, and the content transmission unit 550 which, in response to a request for the start of the conference, transmits first video streaming data captured by the first terminal of the first user to the first terminal of the second user, transmits second video streaming data captured by the first terminal of the second user to the first terminal of the first user, and transmits the constituent content included in the first content complex and the second content complex to the playback terminals. The package data of the first content complex is uploaded in the content storage unit by the first user, and the package data of the second content complex is uploaded in the content storage unit by the second user.

The content complex providing server 50 according to this embodiment may further include the terminal designating unit 570 for designating the playback terminals of the constituent content if a plurality of constituent content is included in the content complex stored in the content storage unit 510. The terminal designating unit 570 designates the playback terminals of the content complex uploaded by the first user from among the terminals included in the terminal group of the second user, and designates the playback terminals of the content complex uploaded by the second user from among the terminals included in the terminal group of the first user.

According to one embodiment, the content complex providing server 50 may receive a transmission command of the content complex inputted from the user, and transmit the content complex to the other party when the transmission command is inputted.

Figure 22:
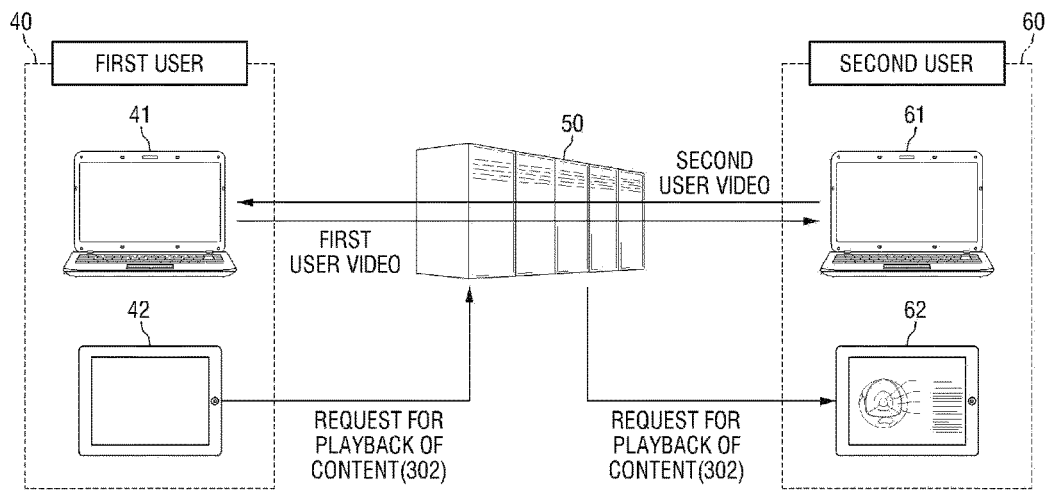
FIG. 22 is a conceptual diagram for explaining a first application operation of the content complex providing server in accordance with the second embodiment of the present invention.

Further, according to one embodiment, as shown in FIG. 22, the content complex providing server 50 may transmit the content complex uploaded by each user to the terminal of the other party in advance, and transmit a request for playback of the entire content complex or a request for playback of a specific constituent content included in the content complex to the playback terminal of the other party.

The content complex providing server 50 may perform a relay to allow the terminal of the first user to control the playback of the first content complex in the terminal of the second user, and allow the terminal of the second user to control the playback of the second content complex in the terminal of the first user. That is, the content transmission unit 55 may transmit a playback control signal of the first constituent content received from one of the terminals included in the terminal group of the first user to a second terminal of the second user, and transmit a playback control signal of the second constituent content received from one of the terminals included in the terminal group of the second user to a second terminal of the first user.

The first constituent content is a document type content, and the playback control signal may be a control signal for changing the page. For example, the first user may change the page of the first constituent content that is played by the second user through a second terminal 52 by operating his/her own terminal.

Figure 23:
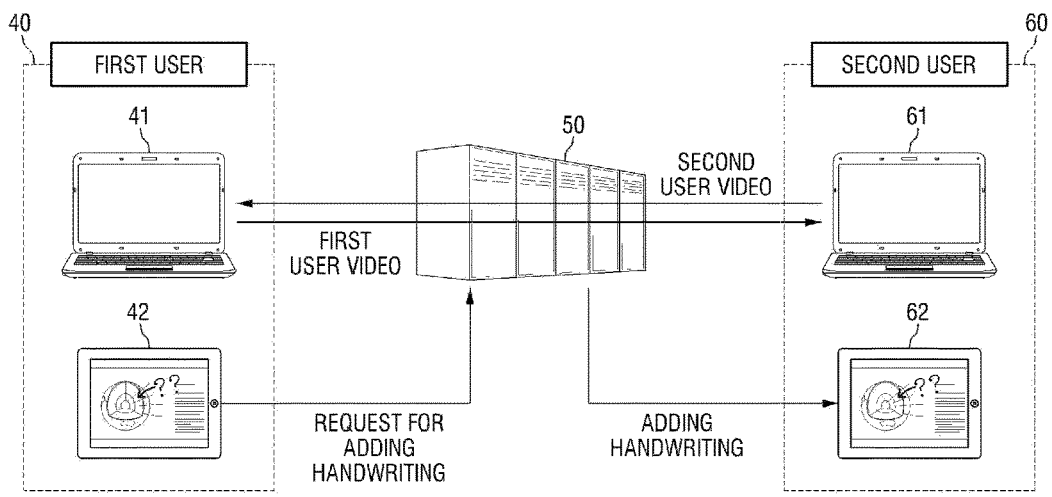
FIG. 23 is a conceptual diagram for explaining a second application operation of the content complex providing server in accordance with the second embodiment of the present invention.

Meanwhile, as shown in FIG. 23, the first constituent content is a document type content, and the playback control signal may be a control signal for additionally displaying handwritten graphics on the first constituent content. For example, the first user may input handwriting by operating his/her own terminal 42, and the same handwriting may be displayed on the first constituent content being played by the second user through a second terminal 62. It is preferable that the terminal into which the first user has inputted handwriting also plays the first constituent content. According to the embodiment shown in FIG. 23, there is an effect of providing the environment in which the first user and the second user exchange opinions by adding handwriting on the same space.

Hereinafter, a content complex providing server in accordance with a third embodiment of the present invention will be described. The content complex providing server 50 according to the third embodiment may provide a lecture content complex 300.

Figure 24:
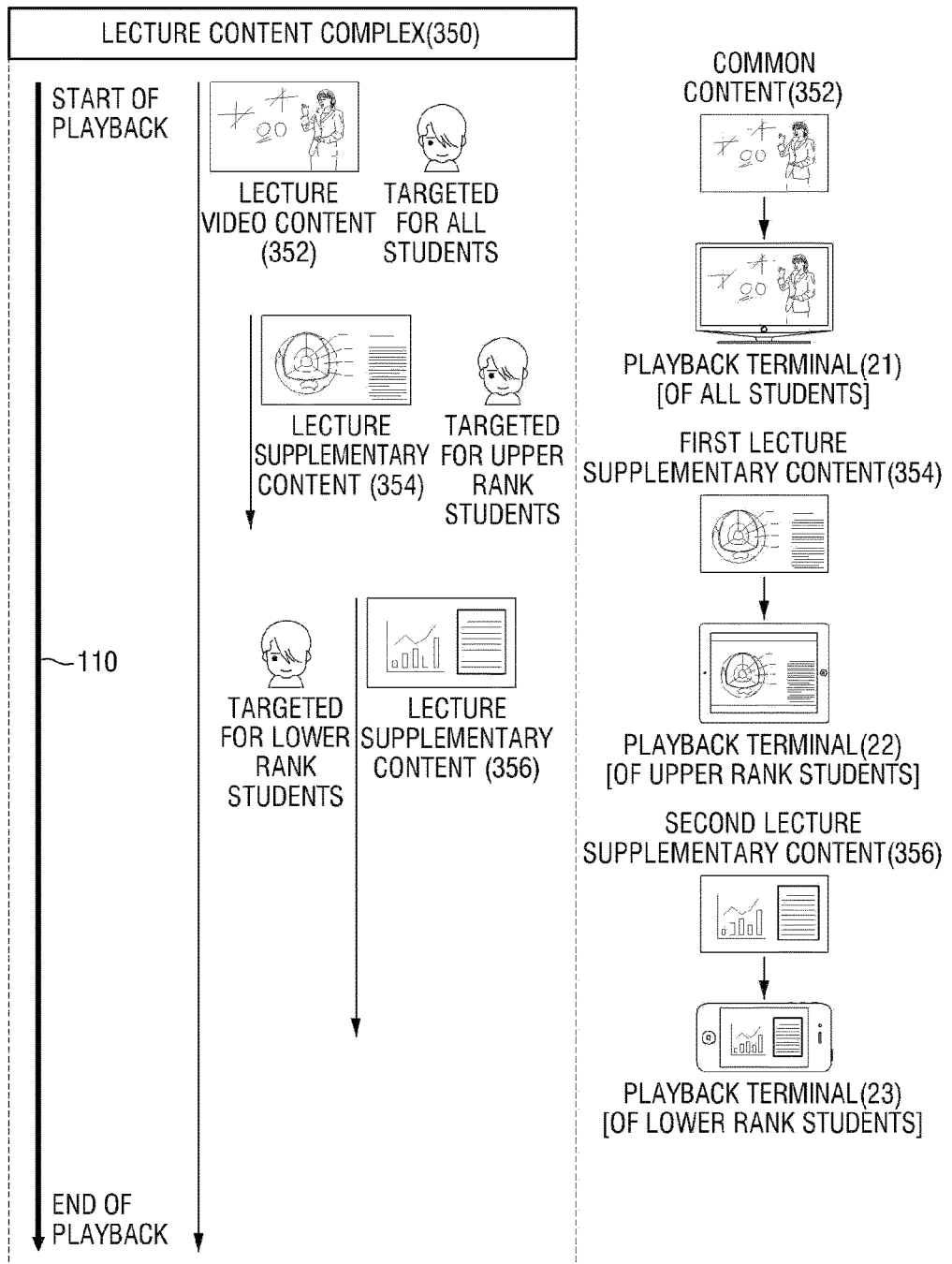
FIG. 24 is a diagram schematically showing an exemplary configuration of a lecture content complex provided from a content complex providing server in accordance with a third embodiment of the present invention.

As shown in FIG. 24, the lecture content complex 350 may include a lecture video content 352. The lecture video content 352 may be provided to all students regardless of, e.g., the student's grades. The lecture content complex 350 may further include a first lecture supplementary content 354 targeted for upper rank students and a second lecture supplementary content 356 targeted for lower rank students.

Although a case where the lecture content complex 350 includes two lecture supplementary content 354 and 356 has been illustrated in FIG. 24, the lecture content complex 350 according to this embodiment can be extended to include one or more lecture supplementary content.

The content complex providing server 50 according to this embodiment receives a request for playback of the lecture content complex 350 from a student, designates the playback terminals of the lecture video content and the lecture supplementary content among the terminals included in the terminal group of the student, and transmits the lecture video content and the lecture supplementary content to the playback terminals. A time point of playing each of the lecture supplementary content may be specified according to the timeline of the video content, or under conditions that a predetermined interaction is inputted.

The content complex providing server 50 according to this embodiment provides a support such that, if the user has two or more terminals, the user can take a lecture by using the lecture video content through one terminal among the two or more terminals while referring to the lecture supplementary content through the other terminal at an appropriate timing or according to the appropriate requirements. Since the user needs to make only one request for playback of the lecture content complex 350 without having to separately make a request for playback of the lecture video content and a request for playback of the lecture supplementary content and, there is an effect of increasing the student's convenience.

The content complex providing server 50 includes the content storage unit 510 which stores package data of the content complex containing the first lecture video content and the first lecture supplementary content, the profile storage unit 530 which stores profile information of the student, the profile information containing information on the terminal group including a plurality of terminals, the terminal designating unit 570 which, in response to the student's request for playback of the content complex, designates one or more terminals among the terminals of the terminal group as the playback terminals of the first lecture video content, designates one or more terminals of the remaining terminals which are not designated as the playback terminals of the lecture video content as the playback terminals of the first lecture supplementary content, and provides information on the playback terminals of the content included in the content complex to the content transmission unit, and the content transmission unit 550 which receives information on the playback terminals and transmits the first lecture video content and the first lecture supplementary content to the playback terminals.

Figure 25:
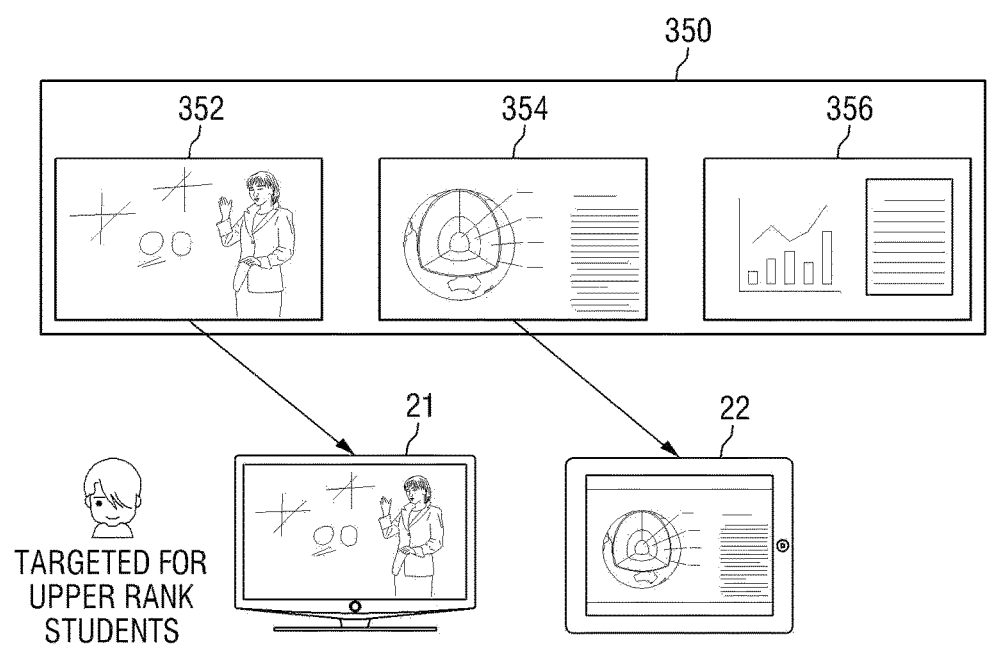
FIGS. 25 and 26 are diagrams schematically showing an example in which playback terminals are designated according to the operation of the content complex providing server in accordance with the third embodiment of the present invention.
Figure 26:
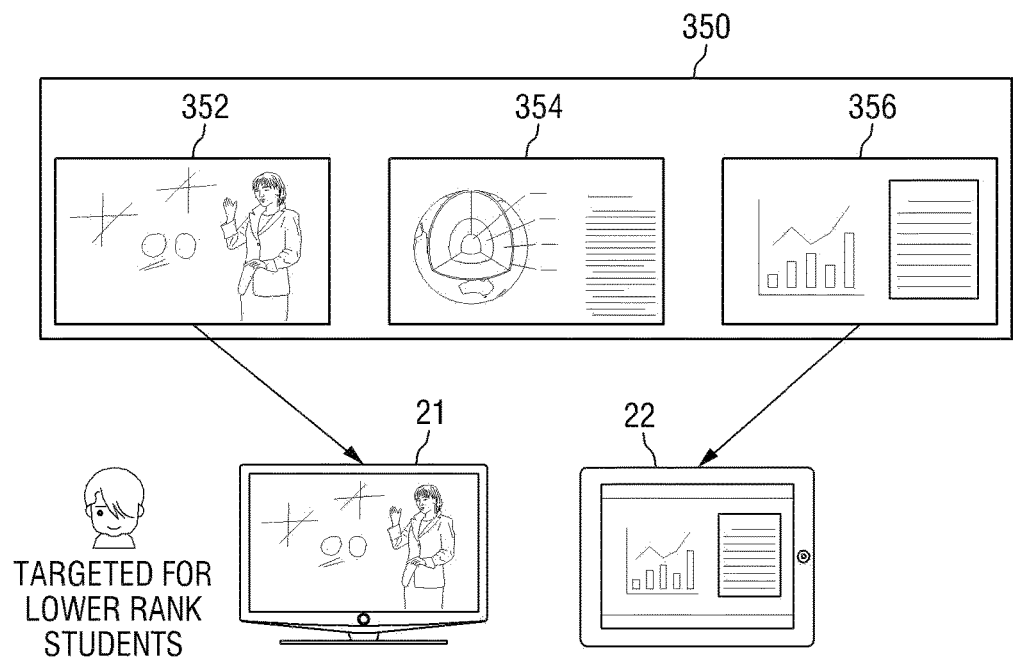

Meanwhile, as shown in FIG. 24, the lecture content complex 350 may include two or more lecture supplementary content corresponding to the level of the student. In order to support learning according to the level, the content complex providing server according to this embodiment may further include a content selecting unit (not shown) which selects one of the first lecture supplementary content and the second lecture supplementary content according to the lecture level information of the student. FIGS. 24 and 25 illustrate that the lecture supplementary content being serviced according to the level of the student is varied.

Figure 27:
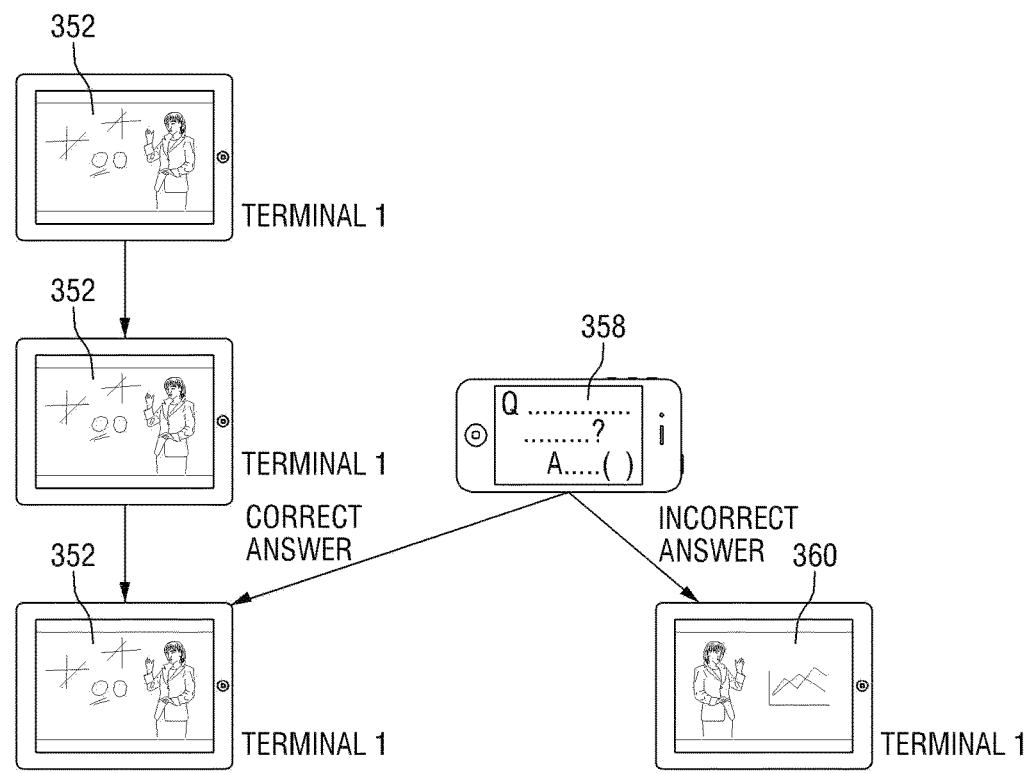
FIG. 27 is a conceptual diagram for explaining an application operation of the content complex providing server in accordance with the third embodiment of the present invention.

Meanwhile, as shown in FIG. 27, the lecture content complex 350 may include two or more lecture video content 352 and 360. For example, while the first lecture video content 352 is played through terminal 1, a first lecture supplementary content 358 including a question display area and an input area in which an answer to the question is entered is played through terminal 2. If an incorrect answer is entered, a second lecture supplementary content 360 having a lecture level lower than that of the first lecture video content 352 can be played through terminal 1.

Figure 28:
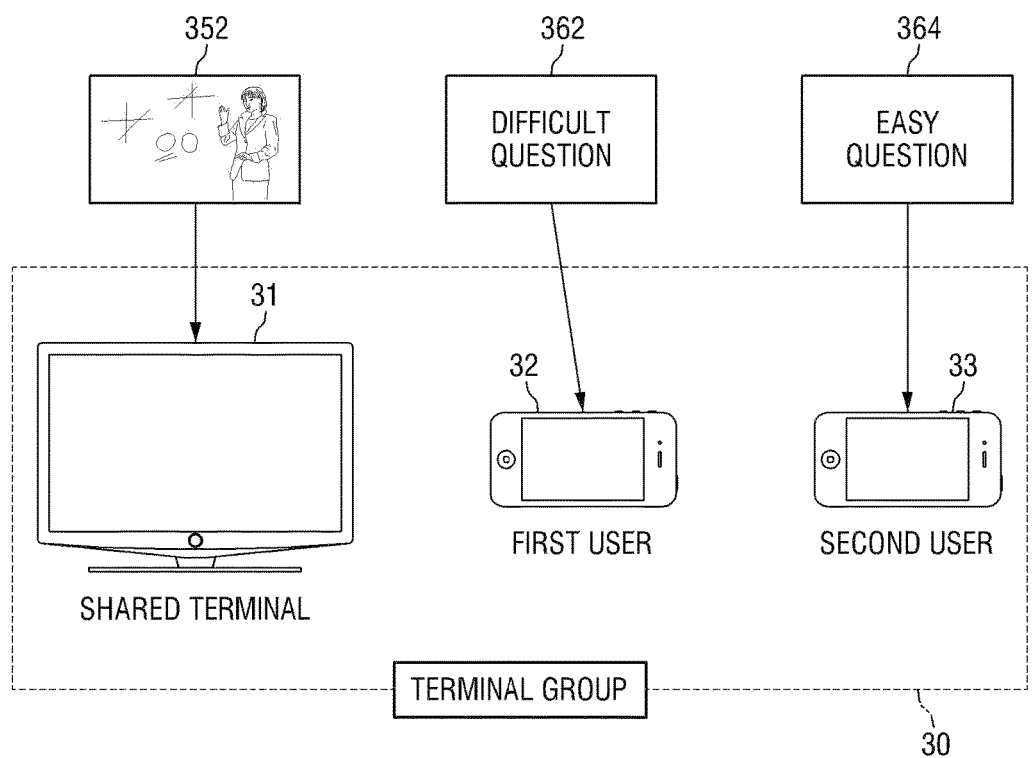
FIG. 28 is a diagram schematically showing an example in which playback terminals are designated according to the operation of the content complex providing server in accordance with the third embodiment of the present invention.

The content complex providing server 50 according to this embodiment may be modified to support a terminal group in which a shared terminal and dedicated terminals are mixed together. For example, as shown in FIG. 28, the terminal group 30 may include the shared terminal 31, the first terminal 32 only for the first user, and the second terminal 33 only for the second user. The content complex providing server 50 may transmit the lecture video content 352 to the shared terminal 31, transmit a first lecture supplementary content 362, in which the user requirements to meet the grade information of a first student are specified, to the first terminal 32, and transmit a second lecture supplementary content 364, in which the user requirements to meet the personal information of a second student are specified, to the second terminal 33. That is, according to this embodiment, for example, while a plurality of students taking an online lecture in one classroom watch the same lecture video through a large monitor in the classroom, the lecture supplementary content optimized for each student's grade level can be played through a dedicated terminal of each student.

Up to now, each component of FIGS. 17 and 19 may mean a software or hardware component such as a field-programmable gate array (FPGA) or an application-specific integrated circuit (ASIC). However, these components are not limited to the software or hardware components, and may be configured so as to be present in an addressable storage medium or to execute one or more processors. Functions provided within the components can be implemented by subdivided components or one component that combines a plurality of components to perform a specific function.

As already mentioned, the content complex providing server 50 may receive data for constituting the content complex from the storage device 60 of a content provider, and generate and store the content complex package data by using the received data. Hereinafter, a case where the content complex providing server 50 generates the content complex package data will be described with reference to FIGS. 29 to 31.

Figure 29:
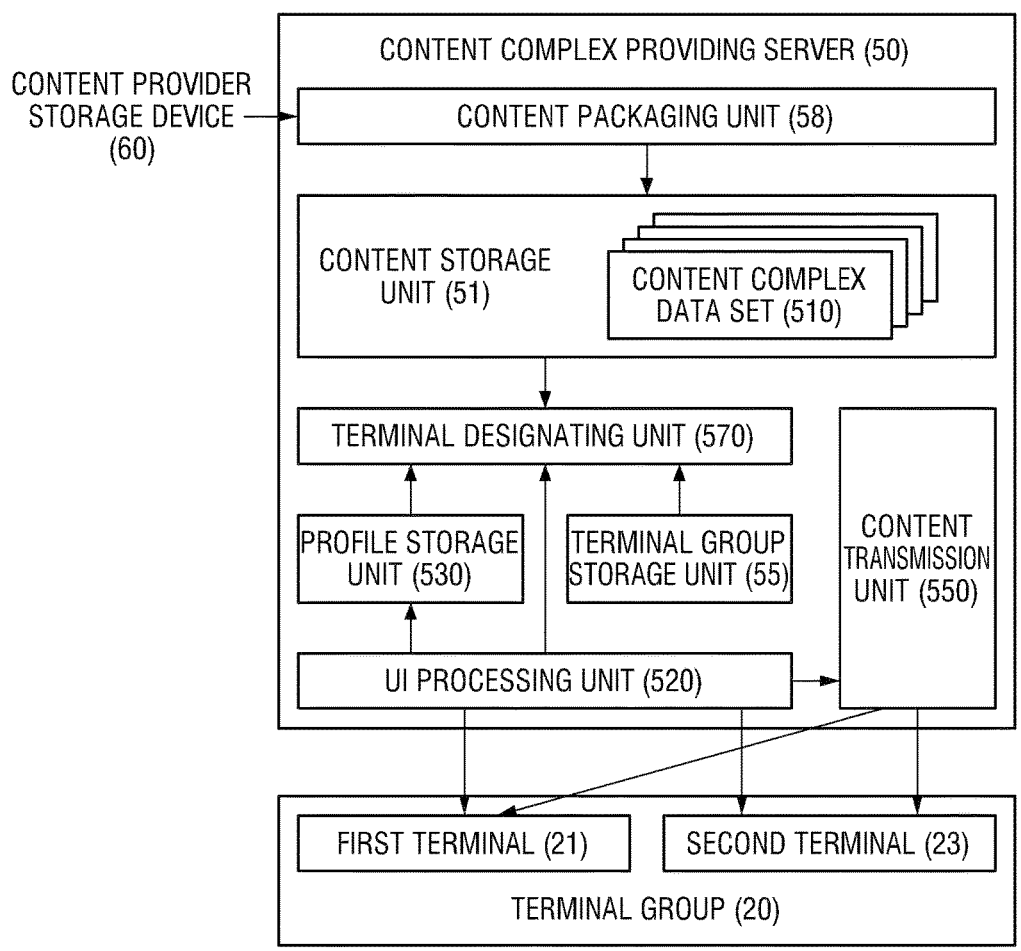
FIG. 29 is a block diagram of a content complex providing server in accordance with another embodiment of the present invention.

Referring to FIG. 29, the content complex providing server 50 according to this embodiment includes a content storage unit 51, a profile storage unit 530, a terminal designating unit 570 and a content transmission unit 550.

The content storage unit 51 stores the package data of the content complex including the first constituent content and the second constituent content. The content complex may further include one or more constituent contents such as third and fourth constituent contents other than the first and second constituent contents. That is, the content complex may include two or more different constituent contents.

The data structure of the content complex package data has been described in detail with reference to FIG. 9. The package data may be provided from the storage device 60 of a content provider.

The profile storage unit 530 stores the profile information of each service user. The profile information may include personal information that has been entered during membership registration of service, dynamic attribute information assigned according to the service use and the like. The dynamic attribute information may include membership level, grade and the like. Further, the profile information may include information on the terminal group corresponding to the user. The terminal group may include at least a first terminal and a second terminal, and the information on the terminal group may include access information or identification information on each terminal included in the terminal group, and a type code and specification information of each terminal.

The terminal designating unit 570 designates at least one of the first terminal and the second terminal included in the terminal group of the specific user as a playback terminal of the first constituent content and designates one of the first terminal and the second terminal as a playback terminal of the second constituent content in response to receiving a request for playback of the content complex from a specific user. It is preferable that the terminal designating unit 570 designates a playback terminal such that each of the first terminal and the second terminal plays at least one constituent content. A configuration in which the terminal designating unit 570 designates a playback terminal of each constituent content included in the content complex for the content complex which is requested to be played can be seen from the description with reference to FIGS. 3A to 3D.

The terminal designating unit 570 may refer to a type code or specification information of each terminal included in the profile information in order to designate a playback terminal corresponding to the attributes of each constituent content. Meanwhile, according to one embodiment, the terminal designating unit 570 may designate a playback terminal of each constituent content on its own, but the playback terminal may be designated by the user. In this case, the terminal designating unit 570 may further receive information for designating the playback terminal from the terminal which is requested to be played and, in response to further receiving the information for designating a playback terminal from the terminal, designate the playback terminals of the first constituent content and the second constituent content based on the further received information.

The content transmission unit 550 may transmit the first constituent content and the second constituent content to the playback terminals. The content transmission unit 550 may transmit the first constituent content and the second constituent content by using an application layer protocol such as HTTP (HyperText Transfer Protocol), RTP (Real-time Transport Protocol) and RTSP (Real Time Streaming Protocol). The content transmission unit 550 may be configured as, e.g., a media server module or web server engine.

The content complex providing server 50 according to one embodiment may further include a user interface (UI) processing unit 520.

The UI processing unit 520 may provide an online type user interface (UI) to the terminal provided to the content complex providing server 50. The UI processing unit 520 may be configured as, e.g., a web server engine. Therefore, the terminal connected to the UI processing unit 520 may receive a user interface (UI) provided by the UI processing unit 520, and provide an input through the UI to the UI processing unit 520.

The UI processing unit 520 may provide a profile information input UI, process the data inputted through the profile information input UI, and store the data in the profile storage unit 530, or may provide a playback terminal designating UI for receiving an input of the information for designating the playback terminal of each constituent content included in the content complex, process the data inputted through the playback terminal designating UI, and provide the data to the terminal designating unit 570.

The UI processing unit 520 may generate a content display UI to allow each terminal included in the terminal group 20 to receive the constituent contents. It is preferable that the content display UI is configured in the form of a web document.

The UI processing unit 520 may adjust a layout of the content display UI considering the number and type of the constituent contents provided from each playback terminal. Further, the content display UI further including a control panel area in which buttons for control of play, pause, stop, and jump of the content complex are disposed may be provided to at least one terminal among the terminals included in the terminal group.

For example, the UI processing unit 520 may generate a first content display UI including link information about the constituent content in which the first terminal is designated as a playback terminal, and transmit it to the first terminal, and may generate a second content display UI including link information about the constituent content in which the second terminal is designated as a playback terminal, and transmit it to the second terminal. The first and second terminals may receive the first constituent content or the second constituent content from the content transmission unit 550 by receiving and rendering the first and second content display UI in the format of a web document.

Meanwhile, the UI processing unit 520 may provide the content display UI including an edit area for inputting the interaction to at least one terminal among the terminals included in the terminal group in order to receive an input of the interaction from the user terminal while the interactive type content complex is being played.

According to the present embodiment, since the UI processing unit 520 provides the UI in the form of a web document, there is an effect in which the content complex can be played regardless of the OS installed in the terminals included in the terminal group.

The content complex providing server 50 according to the present embodiment may further include a content packaging unit 58. The content packaging unit 58 receives data for constituting the content complex from the storage device 60 of a content provider, generates the content complex data set 510 by using the received data, and stores the data in the content storage unit 51. The content packaging unit 58 may include a web server module, and a content complex uploading UI may be included in the web document.

The content complex uploading UI may include not only an area for uploading data of the constituent contents constituting the content complex but also an area for inputting a playback schedule of the content complex. The content packaging unit 58 may generate the playback schedule data 515 by using the data inputted through an area for inputting the playback schedule.

For example, in the case of constituting the content complex including the first constituent content and the second constituent content, the content packaging unit 58 may receive the first constituent content and the second constituent content and convert them into the format for streaming selectively according to the type of the first constituent content and the second constituent content.

Figure 30:
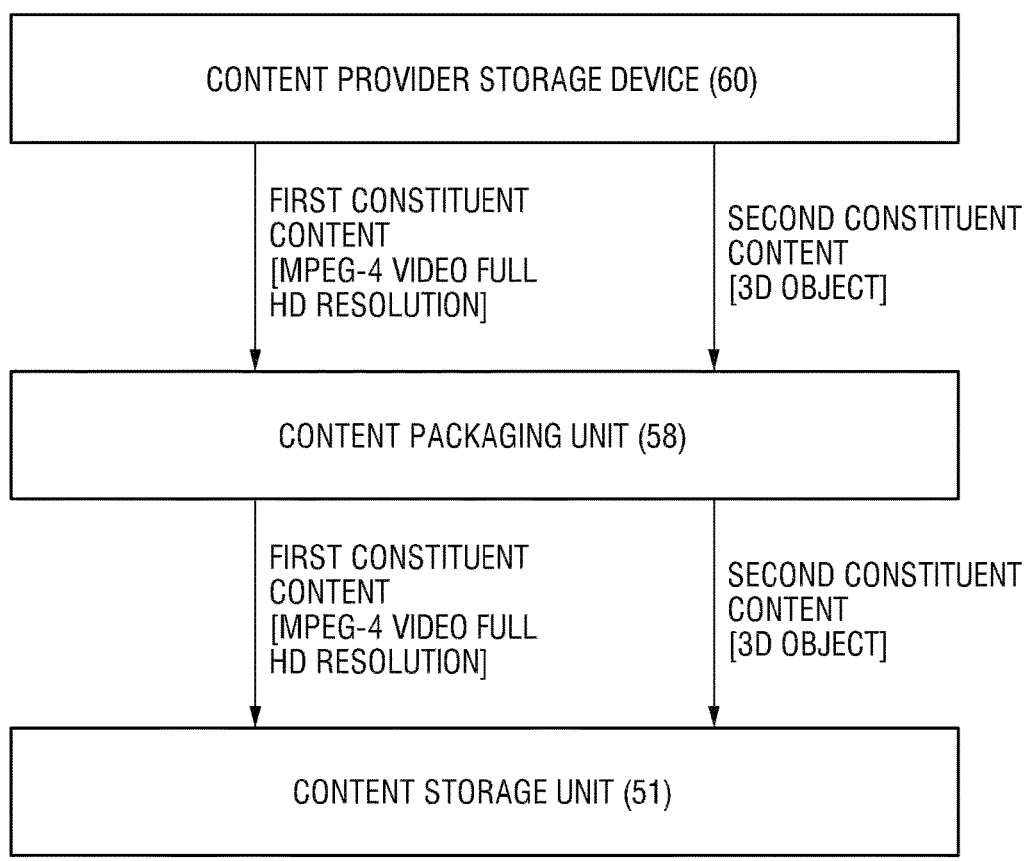
FIGS. 30 and 31 are enlarged block diagrams for explaining an operation of a content package unit of the content complex providing server shown in FIG. 29.

To describe the meaning of selective conversion with reference to FIG. 30, in the case of receiving the first constituent content having a FULL HD resolution from the storage device 60 of the content provider, since the content having a FULL HD resolution is not suitable for streaming due to a large size of data, the content packaging unit 58 may perform the conversion into a content having a HD resolution to reduce the resolution, and store the first constituent content with the reduced resolution in the content storage unit 51. Further, when receiving the second constituent content in the form of a 3D object from the storage device 60 of the content provider, the second constituent content may be converted into a web 3D object and stored in the content storage unit 51 to enable the transmission of the content through the Web. In FIG. 30, both the first and second constituent contents have been converted into the format for streaming, but if the format of the constituent content provided from the storage device 60 of the content provider is already a format suitable for streaming, the conversion operation in the content packaging unit 58 is unnecessary. That is, "selectively converting" means conversion or non-conversion in accordance with the format of the constituent content provided from the storage device 60 of the content provider.

According to an embodiment, the content packaging unit 58 may divide each object included in one content into constituent contents to constitute the content complex. This will be described with reference to FIG. 31.

Figure 31:
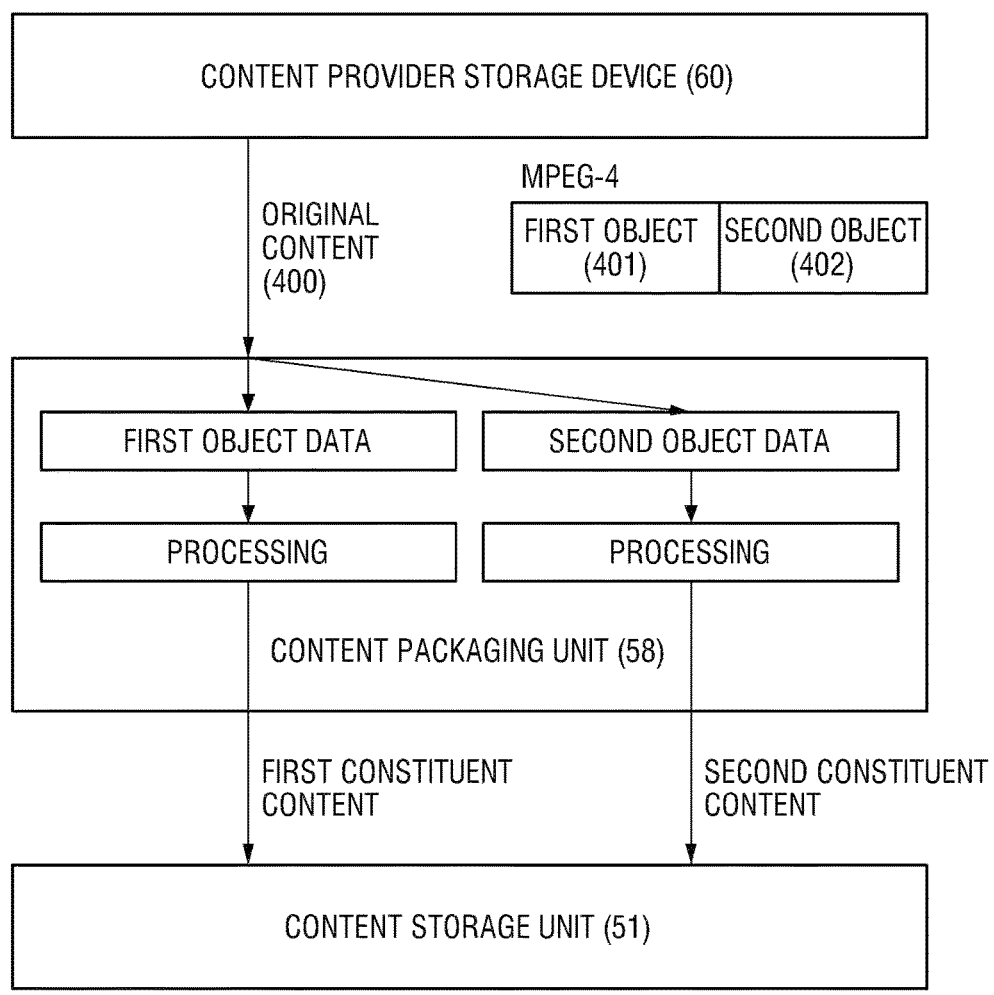

As shown in FIG. 31, the contents provided from the storage device 60 of the content provider are not those that are divided by the number of constituent contents to be included in the content complex, and only one original content 300 may be provided. The original content 300 may be encoded in an object-oriented encoding manner, and limited to those that can be extracted from the original content 300. The original content 300 may be, e.g., a content of a MPEG-4 (Moving Picture Experts Group) type. The MPEG-4 original content is obtained by multiplexing the first object and second object according to the MPEG-4 standards, and the data of the first object and the data of the second object are elementary streams (ES) of the first object and the second object, respectively.

As shown in FIG. 31, assuming that a first object 301 and a second object 302 are included in the original content 300, the content packaging unit 58 may extract the first object data and the second object data from the original content 300 and process them into a first constituent content 101 and a second constituent content 103.

As well known, in the MPEG-4 content, video, audio, subtitle, 3D object and the like are managed as respective objects. In addition, BIFS (Binary Format for Scenes) based on VRML97 (Virtual Reality Modeling Language) is defined as a specification for the scene technology in order to deal with a combination of a plurality of objects. For example, it is possible to create an application in which the user can move a certain object, or the objects are displayed to overlap each other by encoding video and audio of people or background as separate objects.

The content packaging unit 58 may extract each object data included in a MPEG-4 original content 400 and convert the extracted object data into the format suitable for streaming by utilizing various techniques included in the MPEG-4 standards. In this case, for example, the video stream included in the original content 400 can be converted into the first constituent content and played through the first terminal, and the audio stream included in the original content 400 can be converted into the second constituent content and played through the second terminal. Further, a first video object and a second video object included in the original content 400 can be played through different terminals, respectively. For example, the people can be played through different terminals, or the foreground and background can be played through different terminals, respectively. If all of the 2D video stream and 3D video stream are included in the MPEG-4 original content 400, the 2D video stream and 3D video stream can be played through different terminals, respectively.

According to the present invention, the following effects can be obtained. That is, simply by allowing a user to make a request for playback of the complex content, a plurality of constituent contents included in the complex content are distributed and provided to a plurality of terminals owned by the user, and the user can independently use each of the constituent contents included in the complex content.

Further, by simultaneously playing the constituent contents included in the complex content at least at some time points within the entire playback duration of the complex content, it is possible to provide a new content distribution environment.

Further, from the user's perspective, since a three-dimensional message receiving effect can be obtained through a plurality of terminals, it is possible to efficiently understand the information provided from the complex content.

In addition, from the terminal's perspective, since a playback computational load for a plurality of constituent contents included in the complex content can be shared with other terminals, the computational load for playing the entire complex content is distributed, and it is possible to prevent a decrease in operation speed of a specific terminal having an excessive computational load.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A method of providing a content complex, comprising:
receiving a request for playback of the content complex from a user who has registered a terminal group including a first terminal and a second terminal, wherein the content complex includes a first content that is played for all users, and further includes a second content that is played selectively for each user based upon at least one attribute included in membership information of each user, wherein an entire playback time of the content complex includes at least the first content and the second content:
designating the first terminal as a playback terminal of the first content and designating the second terminal as a playback terminal of the second content, whereby the first terminal plays the first content to the user, and the second terminal selectively plays the second content to the user based upon the at least one attribute of the user:
transmitting the first content to the first terminal and the second content to the second terminal;

receiving a request for one of pause, stop and play of a timeline that is a flow of time according to playback of the entire playback time of the content complex from one of the terminals included in the terminal group;

changing a state of the timeline, and transmitting the changed state of the timeline to at least one of the terminals included in the terminal group; and receiving a request for changing a playback position on the timeline from one of the terminals included in the terminal group, changing a current playback position value on the timeline, and transmitting the changed current playback position value of the timeline to at least one of the terminals included in the terminal group, wherein the user owns the terminal group, wherein the first content is a video type content and the second content is a non-video type content, wherein selectively playing back the second content to the user based upon the at least one attribute of the user further comprises automatically playing back the second content on the second terminal at a playback end time for the first content.

2. The method of claim 1, wherein said transmitting comprises transmitting the content complex according to a playback start time of each of the first and second contents included in a playback schedule data of the content complex.

3. The method of claim 1, further comprising converting the second content into a web-based content, wherein said transmitting comprises transmitting the first content in a video streaming manner; and transmitting the second content which has been converted into a web-based content by using a HTTP protocol.

4. The method of claim 1, further comprising storing information about model characteristics of the first and second terminals, wherein the model characteristics are determined by a combination of at least one of a display size, resolution, and computing power, and input means.

5. The method of claim 4, wherein said designating comprises designating at least one of the first and second terminal having model characteristics corresponding to the type of each of the first content and second content as a playback terminal.

6. The method of claim 1, further comprising receiving a check-in request from the first terminal or second terminal, wherein said designating comprises designating at least one of the first and second terminal which has transmitted the check-in request as a playback terminal.

7. The method of claim 6, further comprising transmitting a check-in guidance signal to at least one of the first and second terminal which has not transmitted the check-in request among the first and second terminals constituting the terminal group.

8. The method of claim 1, further comprising selecting one of the first and second content of the content complex as a portion of the content complex to play on at least one of the first and second terminal if a total number of contents of the content complex is larger than a total number of terminals included in the terminal group, wherein said designating comprises designating one of the first and second terminals of the terminal group as a playback terminal for each of the contents, and wherein said transmitting comprises transmitting each of the contents to the designated playback terminal.

9. The method of claim 1, wherein said designating comprises designating at least one of the first and second a terminal as having a priority corresponding to a priority of each of the first content and the second content as a playback terminal.

10. A method of providing a content complex, comprising:

receiving a request for playback of the content complex from a user who has registered a terminal group including a plurality of terminals, wherein the content complex includes a first content that is played for all users, and further includes a second content that is played selectively for each user based upon at least one attribute included in membership information of each user, wherein an entire playback time of the content complex includes at least the first content and the second content;

transmitting a list of each constituent content included in the content complex to one of the first and second terminal;

receiving a playback terminal designating signal to designate the first terminal as a playback terminal of the first content and the second terminal as a playback terminal of the second content in response to transmission of the list of each content from one of the first and second terminal;

transmitting the first content to the first terminal and the second content to the second terminal;

receiving a request for one of pause, stop and play of a timeline that is a flow of time according to playback of the entire playback time of the content complex from one of the terminals included in the terminal group; changing a state of the timeline, and transmitting the changed state of the timeline to at least one of the terminals included in the terminal group; and receiving a request for changing a playback position on the timeline from one of the terminals included in the terminal group, changing a current playback position value on the timeline, and transmitting the changed current playback position value of the timeline to at least one of the terminals included in the terminal group, wherein the user owns the terminal group, wherein the first content is a video type content, and the second content is a non-video type content, wherein selectively playing back the second content to the user based upon the at least one attribute of the user further comprises automatically playing back the second content on the second terminal at a playback end time for the first content.

11. The method of claim 10, wherein said transmitting the list of each content to one of the first and second terminals of the terminal group comprises:

setting at least one terminal having model identification information corresponding to a type of each of the first content and the second content among the terminal group as a recommendation terminal; and transmitting the list of each content included in the content complex including information about the recommendation terminal to one of the first and second terminals of the terminal group.

12. The method of claim 10, further comprising receiving a request for playback of the content complex from one of the first and second terminals of the terminal group, wherein said transmitting the list of each content to one of first and second terminals of the terminal group comprises transmitting the list of each content included in the content complex to the terminal which has transmitted the request for playback of the content complex in response to said receiving the request for playback of a the content complex.

* * * * *